United States Patent
Lavoie et al.

(10) Patent No.: US 10,306,290 B2
(45) Date of Patent: May 28, 2019

(54) STANDARDIZED HOT-PLUGGABLE TRANSCEIVING UNIT WITH BANDWIDTH OPTIMIZATION FUNCTIONALITIES

(71) Applicant: EMBRIONIX DESIGN INC, Laval (CA)

(72) Inventors: Renaud Lavoie, Laval (CA); Eric Dudemaine, Crabtree (CA); Louis Caron, Mascouche (CA)

(73) Assignee: Embrionix Design Inc., Laval (CA)

( * ) Notice: Subject to any disclaimer, the term of this patent is extended or adjusted under 35 U.S.C. 154(b) by 0 days.

(21) Appl. No.: 15/279,467

(22) Filed: Sep. 29, 2016

(65) Prior Publication Data
US 2018/0054646 A1   Feb. 22, 2018

Related U.S. Application Data

(60) Provisional application No. 62/377,700, filed on Aug. 22, 2016.

(51) Int. Cl.
| | |
|---|---|
| *H04N 21/418* | (2011.01) |
| *G02B 6/42* | (2006.01) |
| *H04N 21/422* | (2011.01) |
| *H04N 21/435* | (2011.01) |
| *H04N 21/44* | (2011.01) |
| *H04N 21/61* | (2011.01) |
| *H04N 21/643* | (2011.01) |

(Continued)

(52) U.S. Cl.
CPC ....... *H04N 21/4183* (2013.01); *G02B 6/4292* (2013.01); *H04N 21/422* (2013.01); *H04N 21/435* (2013.01); *H04N 21/438* (2013.01); *H04N 21/44* (2013.01); *H04N 21/4402* (2013.01); *H04N 21/440263* (2013.01); *H04N 21/6125* (2013.01); *H04N 21/64322* (2013.01)

(58) Field of Classification Search
None
See application file for complete search history.

(56) References Cited

U.S. PATENT DOCUMENTS

| | | | |
|---|---|---|---|
| 2002/0039366 A1* | 4/2002 | Sano | H04L 47/15 370/390 |
| 2005/0089013 A1* | 4/2005 | Okagawa | H04L 12/1881 370/351 |

(Continued)

*Primary Examiner* — Justin E Shepard
(74) *Attorney, Agent, or Firm* — IP Delta Plus Inc.

(57) ABSTRACT

A standardized hot-pluggable transceiving unit implementing bandwidth optimization functionalities. The transceiving unit comprises a first connector receiving a signal comprising a source video payload. The transceiving unit comprises a processing unit performing a scaling of the source video payload. The scaling consists in generating a scaled video payload by applying a scaling ratio to the source video payload. The transceiving unit comprises a second connector outputting an IP flow transporting the scaled video payload. In an alternative bandwidth optimization implementation, the first connector receives a plurality of source IP flows each transporting a source video payload. The processing unit selects one among the plurality of source IP flows, and generates outbound IP packets of an outbound IP flow based on stored characteristics of the outbound IP flow. The outbound IP packets transporting the source video payload of the selected source IP flow are outputted by the second connector.

12 Claims, 27 Drawing Sheets

(51) Int. Cl.
    *H04N 21/438* (2011.01)
    *H04N 21/4402* (2011.01)

(56) References Cited

U.S. PATENT DOCUMENTS

| | | | |
|---|---|---|---|
| 2008/0212583 A1* | 9/2008 | Rey | H04L 12/1836 370/390 |
| 2009/0080448 A1* | 3/2009 | Tarra | H04L 12/2836 370/401 |
| 2009/0082095 A1* | 3/2009 | Walker | G07F 17/32 463/25 |
| 2009/0226152 A1* | 9/2009 | Hanes | G06F 17/30056 386/248 |
| 2010/0154014 A1* | 6/2010 | Andersen | H04L 67/1097 725/110 |
| 2011/0075026 A1* | 3/2011 | Wallace | G06T 3/403 348/448 |
| 2013/0111526 A1* | 5/2013 | Glowaty | G06F 17/30817 725/53 |
| 2014/0028907 A1 | 1/2014 | Nuyttens et al. | |
| 2015/0015403 A1* | 1/2015 | LeMaistre | G08B 5/22 340/654 |
| 2015/0215223 A1* | 7/2015 | Spencer | H04L 47/365 370/471 |
| 2015/0312953 A1* | 10/2015 | Wang | H04L 1/00 370/312 |
| 2015/0334442 A1* | 11/2015 | Charania | H04N 21/4263 725/44 |

* cited by examiner

STANDARDIZED HOT-PLUGGABLE TRANSCEIVING UNIT WITH BANDWIDTH OPTIMIZATION FUNCTIONALITIES

TECHNICAL FIELD

The present disclosure relates to the field of standardized hot-pluggable transceiving units. More specifically, the present disclosure relates to a standardized hot-pluggable transceiving unit with bandwidth optimization functionalities.

BACKGROUND

Small Form-factor Pluggable (SFP) units represent one example of standardized hot-pluggable transceiving units. SFP units are standardized units adapted to be inserted within a chassis. A suite of specifications, produced by the SFF (Small Form Factor) Committee, describe the size of the SFP unit, so as to ensure that all SFP compliant units may be inserted smoothly within one same chassis, i.e. inside cages, ganged cages, superposed cages and belly-to-belly cages. Specifications for SFP units are available at the SFF Committee website.

SFP units may be used with various types of exterior connectors, such as coaxial connectors, optical connectors, RJ45 connectors and various other types of electrical connectors. In general, an SFP unit allows connection between an external apparatus, via a front connector of one of the aforementioned types, and internal components of a hosting unit, for example a motherboard, a card or a backplane leading to further components, via a back interface of the SFP unit. Specification no INF-8074i Rev 1.0, entitled "SFP (Small Form-factor Pluggable) Transceiver, dated May 12, 2001, generally describes sizes, mechanical interfaces, electrical interfaces and identification of SFP units.

The SFF Committee also produced specification no SFF-8431 Rev. 4.1, "Enhanced Small Form-factor Pluggable Module SFP+", dated Jul. 6, 2010. This document, which reflects an evolution of the INF-8074i specification, defines, inter alia, high speed electrical interface specifications for 10 Gigabit per second SFP+ modules and hosts, and testing procedures. The term "SFP+" designates an evolution of SFP specifications.

INF-8074i and SFF-8431 do not generally address internal features and functions of SFP devices. In terms of internal features, they simply define identification information to describe SFP devices' capabilities, supported interfaces, manufacturer, and the like. As a result, conventional SFP devices merely provide connection means between external apparatuses and components of a hosting unit, the hosting unit in turn exchanging signals with external apparatuses via SFP devices.

Recently, SFP units with internal features and functions providing signal processing capabilities have appeared. For instance, some SFP units now include signal re-clocking, signal reshaping or reconditioning, signals combination or separation, signal monitoring, etc.

In the field of video transport, advances have been made recently for transporting the payload of a video signal into Internet Protocol (IP) packets (e.g. Serial Digital Interface (SDI) video payloads encapsulated into IP packets). Furthermore, an SFP unit can be adapted to receive the IP flows transporting the video payloads, and to process the video payloads.

One issue with the transport of video IP flows on an IP networking infrastructure is that video IP flows generally require a subsequent amount of bandwidth (which can lead to network congestion), and are very sensitive to delays. The currently deployed IP based video distribution infrastructures do not always make usage of the available bandwidth in an optimized manner. For example, an equipment receives a plurality of video IP flows simultaneously, but only uses one of the video IP flows at a time. In another example, an equipment (e.g. a multiviewer) receives a plurality of video IP flows transmitted at full resolution, and scales down the plurality of video IP flows to a lower resolution in order to display each one of the plurality of video IP flows in a monitoring window with a lower resolution.

US patent application 2014/0028907 A1 by Nuyttens et al. aims at optimizing the delivery of a video signal by using a progression mechanism to separate a video signal containing a video frame into multiple streams. The multiple streams each include data that, when combined by a decoder, form an image having a resolution that depends on a number of streams that are being combined and that is less than full-resolution when the number of streams that are being combined is less than the number of streams into which the video frame is divided. However, with this mechanism, the transmission of a large number of video signals leads to the transmission of an exponentially larger number of corresponding streams. Therefore, this mechanism is adapted for the transmission of a small number of video signals, but may not scale in the case of a video distribution infrastructure for transporting a large amount of video signals. Furthermore, on a large IP networking infrastructure, significant delays may occur between the streams, rendering the reconstruction of a particular image with a particular resolution ineffective because of the delays between the streams which compose the particular image.

Therefore, there is a need for a new standardized hot-pluggable transceiving unit providing bandwidth optimization capabilities.

SUMMARY

According to a first aspect, the present disclosure provides a standardized hot-pluggable transceiving unit. The transceiving unit comprises a housing having specific standardized dimensions and adapted to being inserted into a chassis of a hosting unit. The transceiving unit comprises a first connector for receiving a signal comprising a source video payload. The transceiving unit comprises a processing unit in the housing for performing a scaling of the source video payload. The scaling consists in generating a scaled video payload by applying a scaling ratio to the source video payload. The transceiving unit comprises a second connector for outputting an Internet Protocol (IP) flow transporting the scaled video payload.

According to a second aspect, the present disclosure provides a system comprising a chassis and the previously described standardized hot-pluggable transceiving unit. The chassis is adapted for receiving at least one standardized hot-pluggable transceiving unit, and the chassis comprises at least one processing unit. The previously described transceiving unit is inserted into the chassis.

According to a third aspect, the present disclosure provides a standardized hot-pluggable transceiving unit. The transceiving unit comprises a housing having specific standardized dimensions and adapted to being inserted into a chassis of a hosting unit. The transceiving unit comprises a first connector for receiving a plurality of source Internet Protocol (IP) flows. Each source IP flow transports a source video payload. The transceiving unit comprises memory in the housing for storing characteristics of an outbound IP flow. The characteristics comprise the destination IP address of the outbound IP flow. The destination IP address of the outbound IP flow differs from the destination IP addresses of the source IP flows. The transceiving unit comprises a processing unit in the housing for selecting one among the plurality of source IP flows, and generating outbound IP packets of the outbound IP flow based on the characteristics stored in the memory. The outbound IP packets transport the source video payload of the selected source IP flow. The transceiving unit comprises a second connector for outputting the outbound IP packets of the outbound IP flow.

BRIEF DESCRIPTION OF THE DRAWINGS

Embodiments of the disclosure will be described by way of example only with reference to the accompanying drawings, in which.

DETAILED DESCRIPTION

Figure 1:
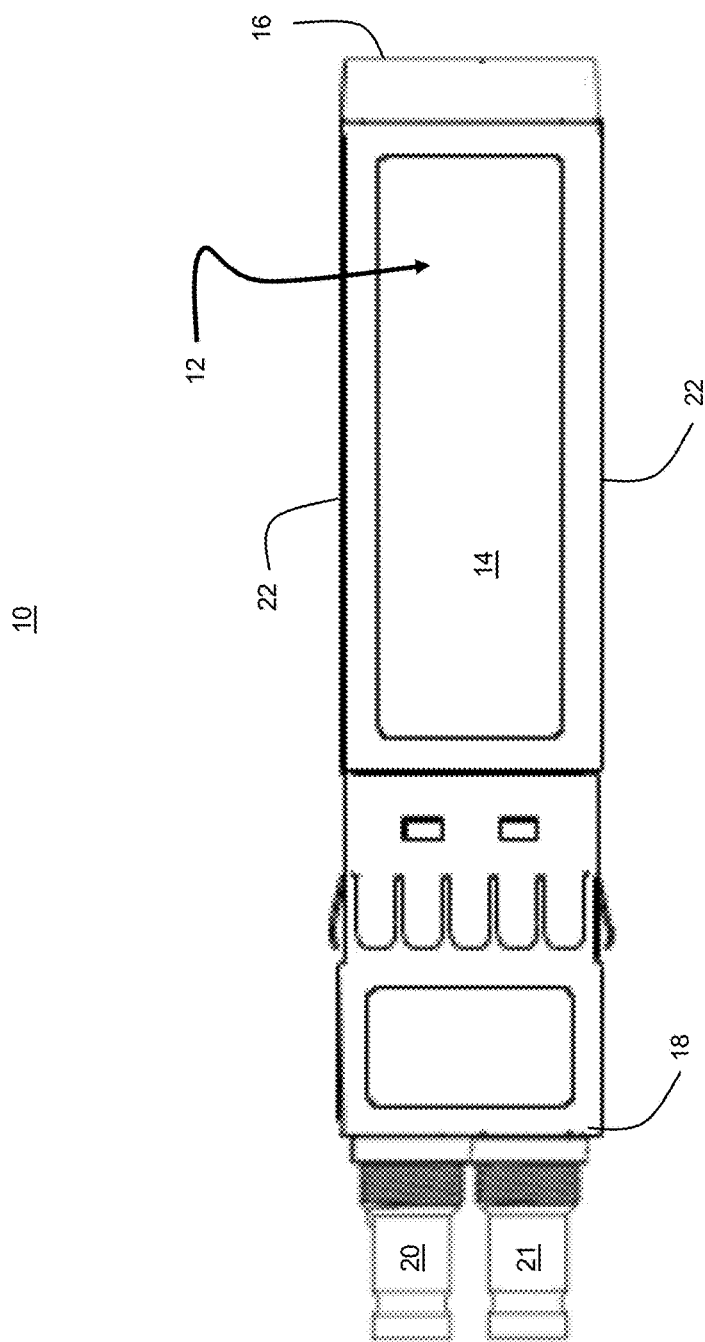
FIG. 1 is a top view of an SFP unit.
Figure 2:
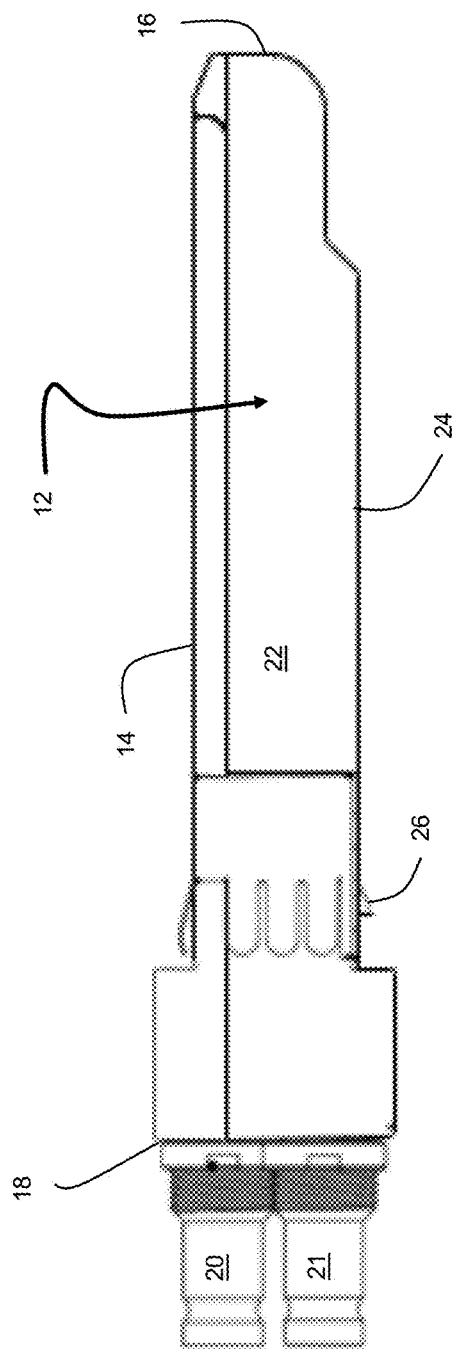
FIG. 2 is a side elevation view of the SFP unit of FIG. 1.
Figure 4:
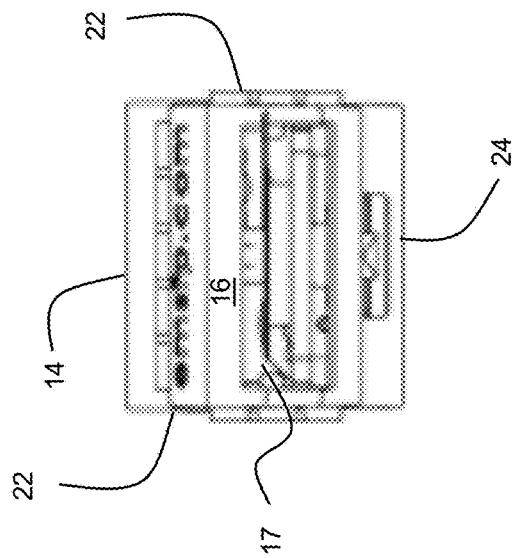
FIG. 4 is back elevation view of the SFP unit of FIG. 1.
Figure 3:
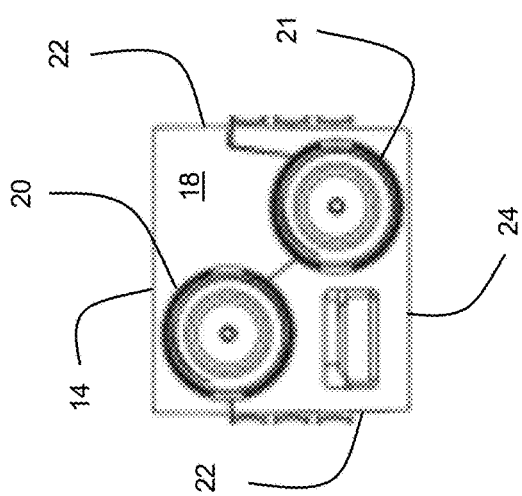
FIG. 3 is a front elevation view of the SFP unit of FIG. 1.
Figure 5:
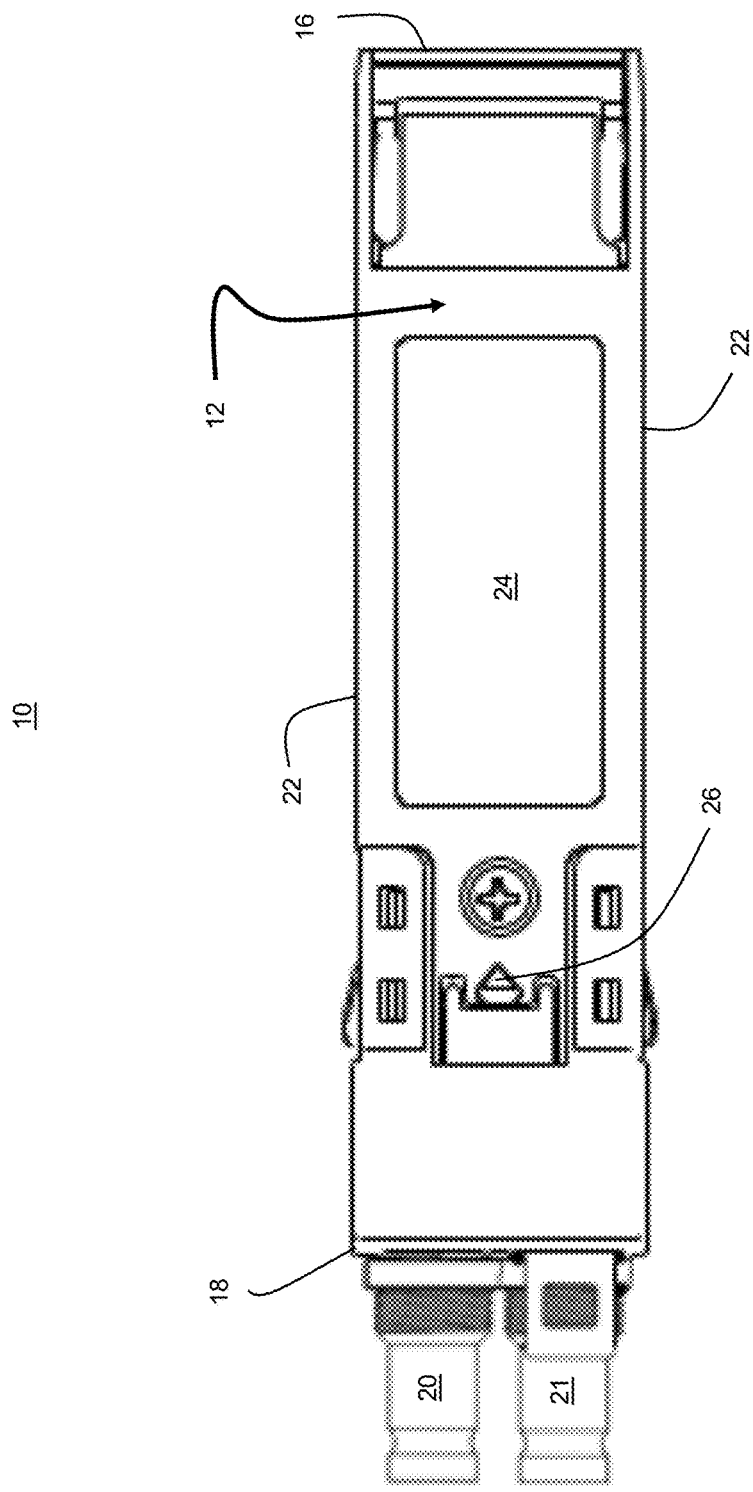
FIG. 5 is a bottom view of the SFP unit of FIG. 1.
Figure 6:
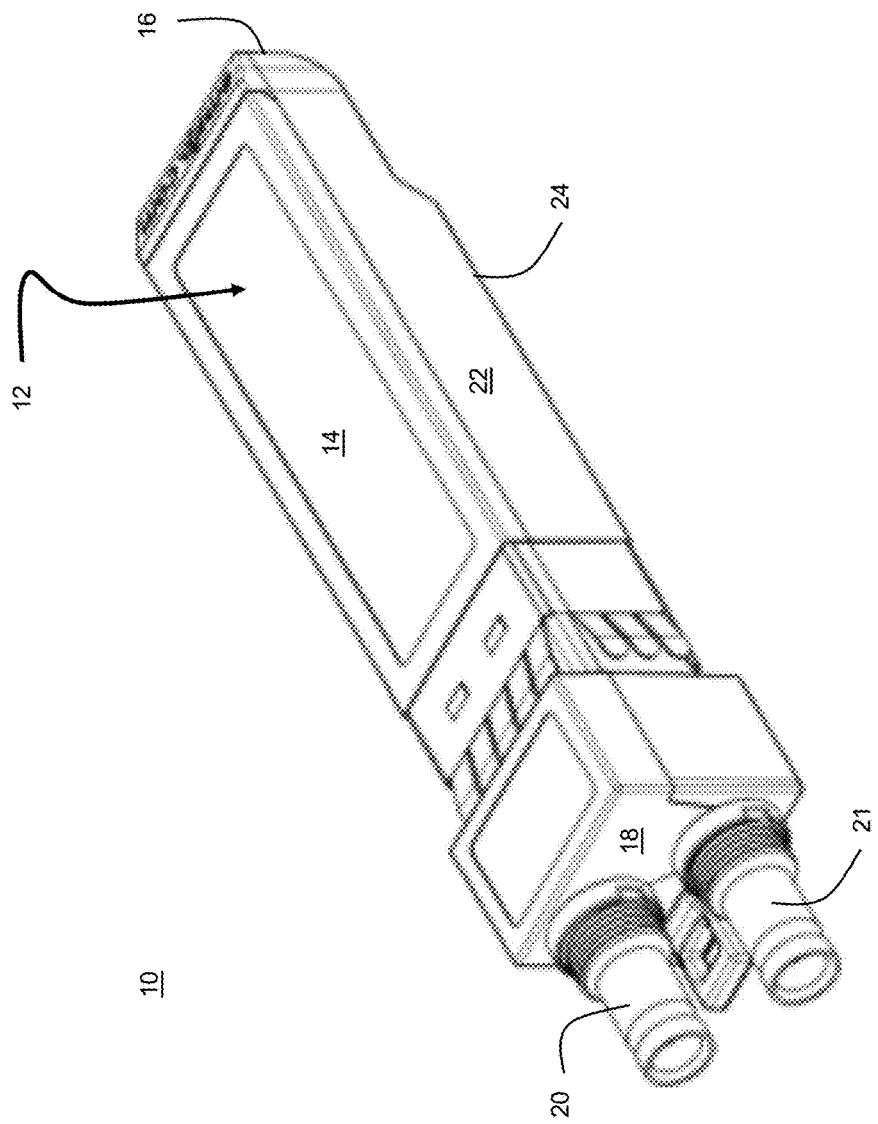
FIG. 6 is a perspective view of the SFP unit of FIG. 1.

The foregoing and other features will become more apparent upon reading of the following non-restrictive description of illustrative embodiments thereof, given by way of example only with reference to the accompanying drawings.

The present disclosure describes standardized hot-pluggable transceiving units, such as Small Form-factor Pluggable (SFP)/SFP+ units, having internal features that far exceed those of conventional units. While conventional units merely provide connection capabilities between a hosting unit in which they are inserted and external apparatuses, the standardized hot-pluggable transceiving unit disclosed herein provides the capability of processing received video flows, in order to optimize the transmission of these video flows over a networking infrastructure.

The following terminology is used throughout the present disclosure:

SFP: Small Form-factor Pluggable, this term refers to units that are insertable into a chassis of a hosting unit; in the present disclosure, an SFP unit complies with an industry standard specification.

Connector: A device component for physically joining circuits carrying electrical, optical, radio-frequency, or like signals.

Video signal: Analog or digital signal usable for display purposes, either directly on a monitor, or through multicast or broadcast.

SDI: Serial Digital Interface, a family of digital video interfaces using one or more coaxial cables with Bayonet Neill-Concelman (BNC) connectors.

Standardized Hot-pluggable Transceiving Unit With Conventional Capabilities

In the rest of the disclosure, an SFP unit is used to illustrate an example of a standardized hot-pluggable transceiving unit. However, the teachings of the present disclosure are not limited to an SFP unit, and can be applied to any type of standardized hot-pluggable transceiving unit.

The SFP unit comprises a housing having a front panel, a back panel, a top, a bottom and two sides. The front panel includes at least one connector for connecting a cable, a fiber, twisted pairs, etc. The back panel includes at least one connector for connecting to a hosting unit. The SFP unit may be fully-compliant or partially compliant with standardized SFP dimensions, such as SFP, SFP+, XFP (SFP with 10 Gigabit/s data rate), Xenpak, QSFP (Quad (4-channel) SFP with 4×10 Gigabit/s data rate), QSFP+, CFP (C form-factor pluggable with 100 Gigabit/s data rate), CPAK or any other standardized Small Form-factor Pluggable unit. Consequently, in the context of the present disclosure, an SFP unit may correspond to SFP, SFP+, XFP, Xenpak, QSFP, QSFP+, CFP, CPAK, or any other known standards related to Small Form-factor Pluggable units.

Reference is now made concurrently to FIGS. 1-6, which are, respectively, a top view, a side elevation view, a front elevation view, a back elevation view, a bottom view and a perspective view of an SFP unit 10. The SFP unit 10 comprises a housing 12. The housing 12 defines a top 14, a bottom 24, and two sides 22. The housing 12 may be at least partially of dimensions in compliance with at least one of the following standards: SFP, SFP+, XFP, Xenpak, QSFP, QSFP+, CFP, CPAK, etc. Alternatively, the housing 12 has functional dimensions based on at least one of the following standards: SFP, SFP+, XFP, Xenpak, QSFP, QSFP+, CFP, CPAK, etc.

The SFP unit 10 further comprises a back panel 16 affixed to the housing 12. The back panel 16 comprises a rear connector 17, for instance an electrical or an optical connector. In an example, the back panel comprises the rear connector 17 (also named a host connector) suitable to connect the SFP unit 10 to a backplane of a chassis (not shown for clarity purposes) of a hosting unit, as known to those skilled in the art.

The SFP unit 10 further comprises a front panel 18 affixed to the housing 12. The front panel 18 comprises one or more connectors, for example a connector 20 of a co-axial cable type such as SDI, adapted to send and/or receive a digital video signal and a connector 21, also of the co-axial cable type, adapted to send and/or receive a digital data signal. The SFP unit 10 further comprises an engagement mechanism, such as for example a latch 26 as shown in a resting position on the bottom 24 in FIG. 2, for maintaining the SFP unit 10 in place within a chassis.

Figure 7A:
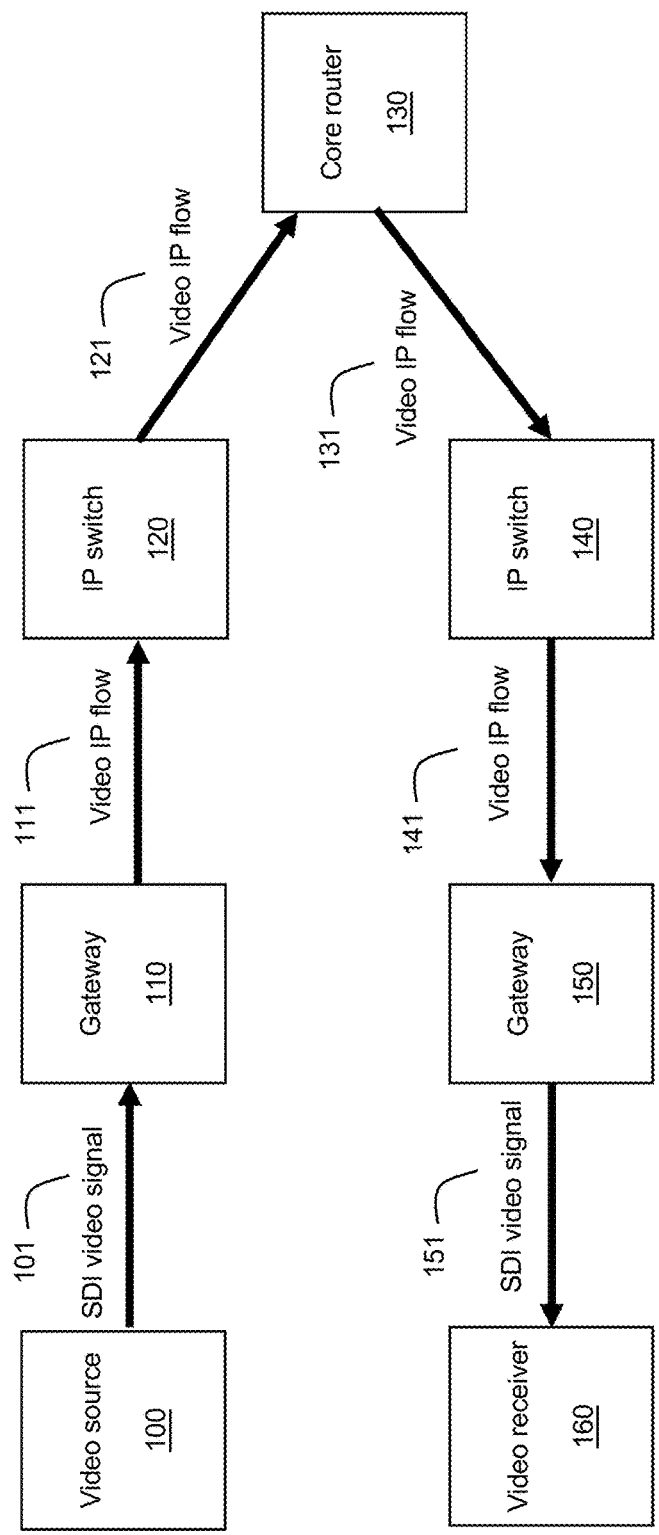
FIGS. 7A to 7C represent a conventional IP based video distribution system for generating, forwarding and delivering IP flows transporting a video payload.
Figure 7B:
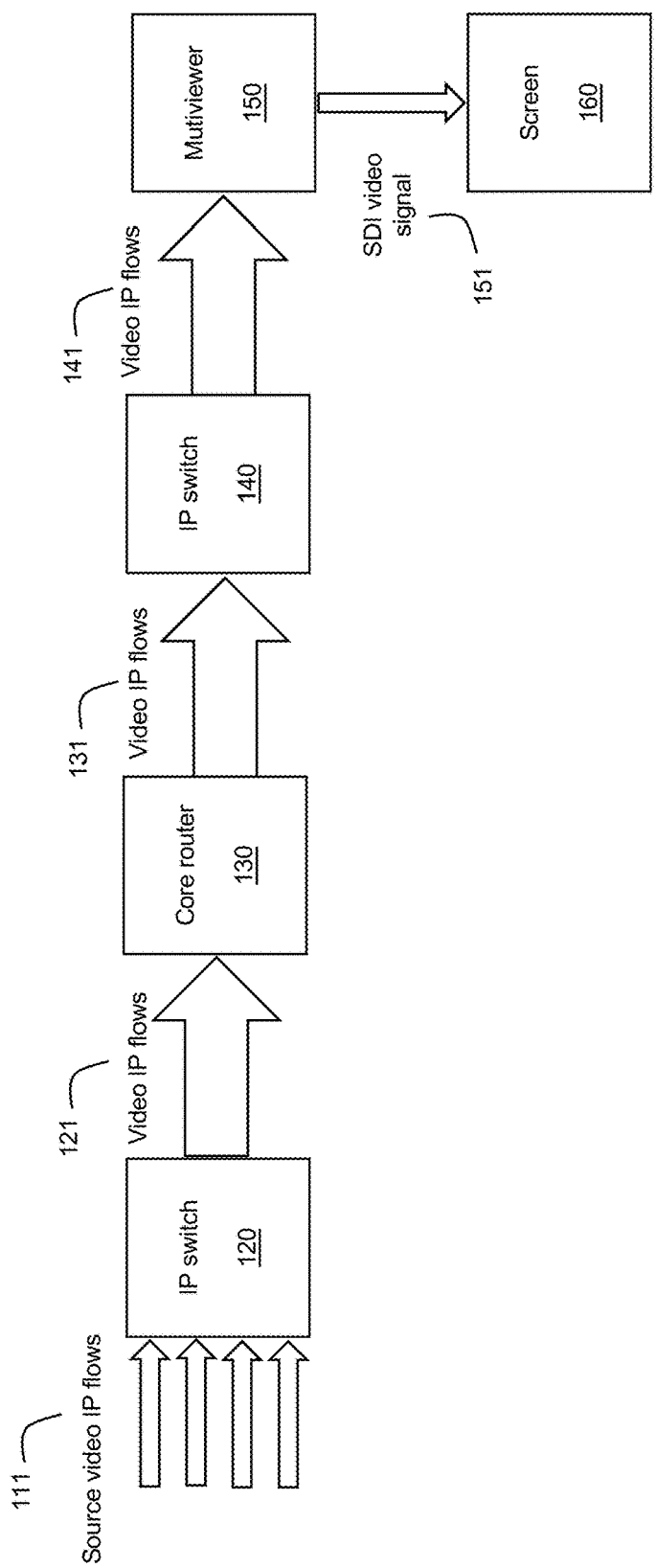
Figure 7C:
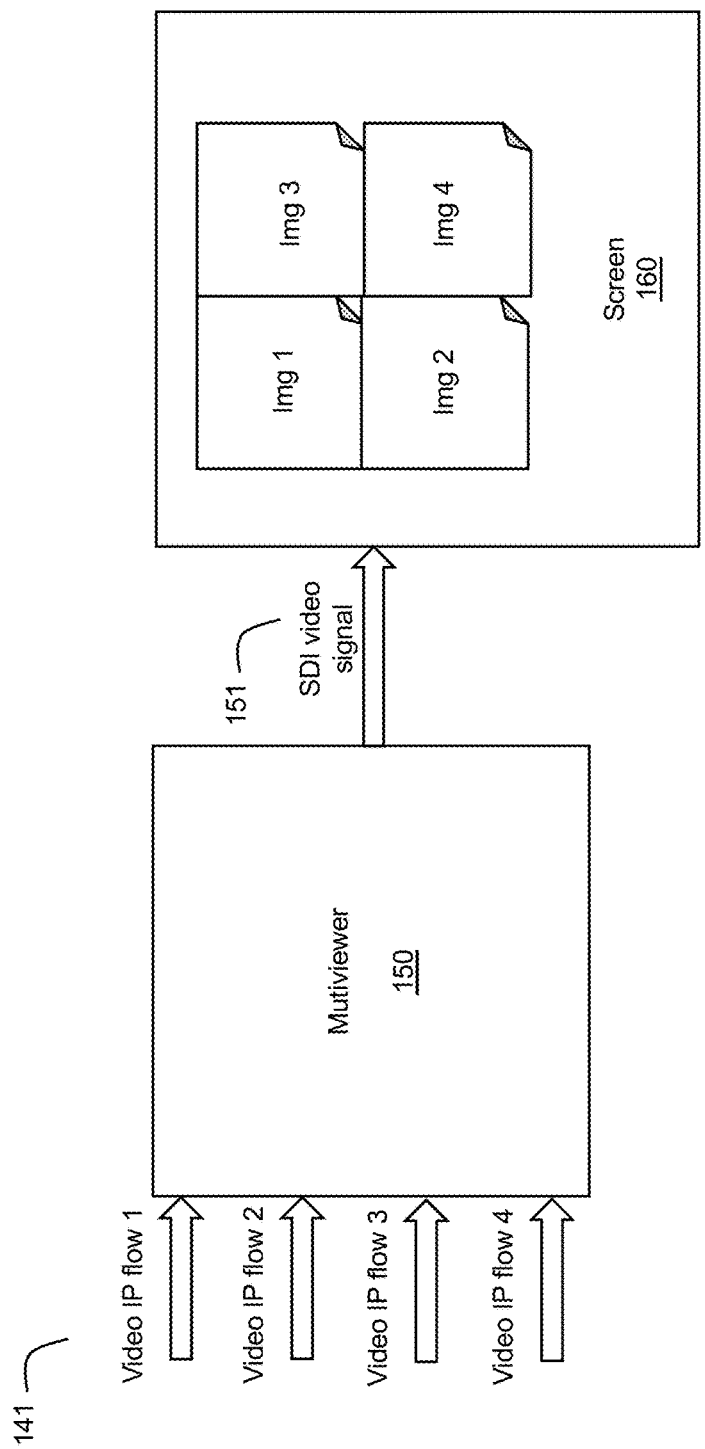

Conventional Architecture for Transporting Video Payloads Over an IP Network Infrastructure Referring now concurrently to FIGS. 7A, 7B and 7C, a conventional IP based video distribution system for generating, forwarding and delivering IP flows transporting a video payload is represented. In the rest of the description, an IP flow transporting a video payload is referred to as a video IP flow.

Referring more particularly to FIG. 7A, a gateway 110 receives one or more video signals 101, and converts the one or more video signals 101 into one or more video IP flows 111 transporting video payloads extracted from the received video signals 101. The video signals 101 are received from one or more video source(s) 100 (a single video source 100 is represented in FIG. 7A for simplification purposes). For example, as illustrated in FIG. 7A, a SDI video signal 101 generated by the video source 100 is received by the gateway 110, and converted into the corresponding video IP flow 111. However, other types of video signals (e.g. High-Definition Multimedia Interface (HDMI) video signals, etc.) can be received by the gateway 110, and converted into corresponding video IP flows. The video signals 101 received by the gateway 110 comprise a video payload, but may also comprise an audio payload and/or a metadata payload (e.g. closed caption text, subtitle text, rating text, a time code (e.g. for indicating a time interval before a program goes live), a Vertical Blanking Interval (VBI), V-chip rating, etc.). Similarly, the video IP flows 111 generated by the gateway 110 comprise corresponding video payloads, but may also comprise corresponding audio payloads and/or corresponding metadata payloads. Examples of video sources 100 include professional video recorders for the film industry, security cameras, television broadcasting equipment, etc. Each received independent video signal 101 is converted by the gateway 110 into a corresponding independent video IP flow 111. Alternatively, several independent video signals received by the gateway 110 are converted and combined into a single corresponding video IP flow 111.

In the present description, the term "SDI video signal" refers to a digital video signal compliant with the SDI standard. It encompasses several variants of the SDI standard, including for example SD-SDI, HD-SDI, ED-SDI, 3G-SDI, 6G-SDI, 12G-SDI, etc.; which have all been standardized by the SMPTE organization. An SDI video signal transports an SDI payload, which comprises a video payload carrying a video component of the SDI signal. The SDI payload generally also comprises at least one additional payload, such as an audio payload for carrying an audio component of the SDI signal and/or a metadata payload for carrying a metadata component of the SDI signal.

A video IP flow is well known in the art. It consists in a sequence of IP packets from a source (e.g. the source gateway 110) to a destination (e.g. a destination gateway 150), delivered via zero, one or more intermediate routing or switching equipment (e.g. IP switch 120, core router 130 and IP switch 140). Several protocol layers are involved in the transport of the IP packets of the video IP flow, including a physical layer (e.g. optical or electrical), a link layer (e.g. Media Access Control (MAC) for Ethernet), an Internet layer (e.g. IPv4 or IPv6), a transport layer (e.g. User Datagram Protocol (UDP)), and one or more application layers ultimately embedding at least one of: a video payload, an audio payload and a metadata payload. The video IP flow provides end-to-end delivery of the application payload (video, audio or metadata) over an IP networking infrastructure such as the one represented in FIG. 7A. The video IP flow may be unicast or multicast.

Some of the video IP flows 111 generated by the gateway 110 may conform to one of the following standards: the SMPTE 2022-5 standard, the SMPTE 2022-6 standard, and the SMPTE 2022-7 standard. These three standards are used singly or in combination for transporting SDI payloads (e.g. a SDI video payload and a corresponding SDI audio payload) over IP. The SMPTE 2022-5 standard provides a Forward Error Correction (FEC) scheme for compensating potential IP packet losses of an IP flow transporting an SDI payload, since IP networks do not provide a guaranteed delivery of all transmitted IP packets. The SMPTE 2022-6 standard provides transport of SDI payloads via the Real-time Transport Protocol (RTP). It also provides an additional protocol layer on top of the RTP layer: the High-Bitrate Media Transport Protocol (HBRMT) protocol layer, which supports a high-precision clock and extra metadata. The SMPTE 2022-7 standard provides seamless protection switching to an IP flow transporting an SDI payload, by sending two matching streams of IP packets from a source to a destination over different paths, and have the receiver switch automatically between them.

In the case of a unicast video IP flow, the destination gateway 150 is determined for each video IP flow 111 generated by the source gateway 110, and the destination IP address of the IP packets of the video IP flow 111 is set to an IP address of the destination gateway 150. The video IP flows are transported over the IP networking infrastructure illustrated in FIG. 7A, where the source gateway 110 generates video IP flows, which are transported via intermediate IP switch 120, core router 130 and IP switch 140, to the destination gateway 150.

In the case of a multicast video IP flow, the video IP flow 111 has a specific multicast address corresponding to a specific multicast group, and is delivered via a multicast infrastructure, as is well known in the art. The destination IP address of the IP packets of the video IP flow 111 generated by the source gateway 110 is set to the specific multicast address. The destination gateway 150 needs to register to the specific multicast group (e.g. via the Internet Group Management Protocol (IGMP)) for receiving the multicast video IP flow.

The IP switch 120 receives video IP flows 111 from one or more source gateway(s) 110 (a single gateway 110 is represented in FIG. 7A for simplification purposes), processes the received video IP flows 111 according to forwarding algorithms (as is well known in the art), and generates corresponding video IP flows 121 transmitted to the core router 130. The video IP flows 111 and 121 are generally identical, but may also be slightly different (e.g. the original video IP flows 111 have no Quality of Service (QoS) characteristics, while the video IP flows 121 have been allocated a particular QoS parameter by the IP switch 120). An edge router with routing capabilities may also be used in place of the IP switch 120. Although not represented in FIG. 7A for simplification purposes, a video source 100 (e.g. an IP based video server) may generate a video IP flow 111 which is directly transmitted to the IP switch 120 without an intermediate gateway 110.

Similarly, the core router 130 receives video IP flows 121 from one or more IP switch(es) 120 (a single IP switch 120 is represented in FIG. 7A for simplification purposes), processes the received video IP flows 121 according to routing algorithms (as is well known in the art), and generates corresponding video IP flows 131 transmitted to the IP switch 140. As mentioned previously, the video IP flows 121 and 131 are generally identical, but may also be slightly different.

Similarly, the IP switch 140 receives video IP flows 131 from one or more core router(s) 130 (a single core router 130 is represented in FIG. 7A for simplification purposes), processes the received video IP flows 131 according to forwarding algorithms (as is well known in the art), and generates corresponding video IP flows 141 transmitted to the destination gateway 150. As mentioned previously, the video IP flows 131 and 141 are generally identical, but may also be slightly different.

The destination gateway 150 converts the IP flows 141 received from one or more IP switch(es) 140 (a single IP switch 140 is represented in FIG. 7A for simplification purposes) into corresponding video signals 151, which are further transmitted to one or more video receiver(s) 160 (a single video receiver 160 is represented in FIG. 7A for simplification purposes). For instance, as illustrated in FIG. 7A, the video payload of the source SDI video signal 101 is transported (in the video IP flows 111, 121, 131 and 141) to the destination gateway 150, where a destination SDI video signal 151 comprising the video payload is generated and outputted to the video receiver 160.

The IP networking infrastructure represented in FIG. 7A is for illustration purposes only. A more complex or a less complex networking hierarchy may be implemented, using more and less intermediate switches and/or more or less intermediate core routers. For instance, the video source 100 is connected to a plurality of video gateways. The video gateway 110 is connected to a plurality of IP switches. The IP switch 120 is connected to a plurality of core routers. The IP switch 140 is connected to a plurality of video gateways. The video gateway 150 is connected to a plurality of video receivers. Furthermore, although in FIG. 7A video IP flows have been represented flowing from (source) gateway 110 to (destination) gateway 150, video IP flows can also be flowing simultaneously from (source) gateway 150 to (destination) gateway 110.

The IP switches 120 and 140 are capable of performing layer 3 and/or layer 2 forwarding of IP packets, as is well known in the art. The term IP switch is used generically, and may encompass switches, routers, etc. A router (such as core router 130) generally has more sophisticated routing capabilities than a switch.

The transport of video payloads on an IP networking infrastructure has a major impact in terms of network load, which may result in congestion of the IP network, delays in the delivery of IP packets transporting a video payload, or even loss of packets (with an optional retransmission of the lost packets). For instance, a single video IP flow transporting a video payload requires a bandwidth of 1.5 Gbps in the case of a 720p or 1080i High Definition (HD) format, and a single video IP flow transporting a video payload requires a bandwidth of 3 Gbps in the case of a 1080p HD format. Since video is generally time sensitive, delays have a major impact on the perceived quality of a video transmission. Existing technologies, such as Qualify of Service (QoS) policies can be used to guarantee the delivery of a video IP flow within acceptable boundaries in terms of delays. However, enforcing a QoS policy for a video IP flow increases the cost (a premium fee needs to be paid for benefiting of a QoS policy prioritizing the IP packets of a particular IP flow) and/or complexity of delivery (additional control signaling is used to enforce the QoS policy). The congestion occurs at the edge of the IP networking infrastructure (e.g. between gateways 110, 150 and IP switches 120, 140), and/or at the core of the IP networking infrastructure (e.g. between IP switches 120, 140 and core router 130).

Referring more particularly to FIGS. 7B and 7C, a particular use case is illustrated, where the destination gateway 150 is a multiviewer. A multiviewer is well known in the art. The multiviewer 150 receives a plurality of video payloads corresponding to a plurality of full size images. The multiviewer 150 scales the plurality of full size images and combines the resulting scaled images in a single image projected on a screen 160 (or a plurality of screens).

FIGS. 7B and 7C represent the transmission of four source video IP flows 111, received by the source IP switch 120, to the multiviewer 150, via the core router 130 and destination IP switch 140. The video source 100 and gateway 110 of FIG. 7A are not represented for simplification purposes. For example, the multiviewer 150 receives the four video IP flows 141, extract four full size images (not represented in the Figures), scales the four full size images by a scaling ratio of 1/2 (the length and the width of the full size images are both reduced by a ratio of 1/2) into scaled images Img 1, Img 2, Img 3 and Img 4. The multiviewer 150 combines the four scaled images into a full size image transmitted to the screen 160 via a SDI video signal 151, and the full size image comprising Img 1, Img 2, Img 3 and Img 4 is displayed on the screen 160. This example is for illustration purposes only. The multiviewer 150 may use different scaling ratios (in particular use the same scaling ratio or use different scaling ratios for the width and the length of the images), combine any number of images received in a corresponding number of video IP flows 141 by applying appropriate scaling ratios to the received images, control a plurality of screens 160 for displaying a plurality of full size images comprising a combination of scaled images.

If the source video IP flows 111 respectively transport a HD video payload requiring a bandwidth of 1.5 Gbps, a total bandwith of 6 Gbps is necessary for transporting the corresponding IP flows 121, 131 and 141 on the IP networking infrastructure. However, the final image projected on the screen 160 (combining scaled images Img 1, Img 2, Img 3 and Img 4) is equivalent to a single HD video payload, which would have required a bandwidth of only 1.5 Gbps if it had been directly transported on the IP networking infrastructure. Thus, in this exemplary use case, by performing the scaling operation at the destination (multiviewer 150) instead of performing it at the source (e.g. at the IP switch 120), there is a waste of 4.5 Gbps of bandwidth in the IP networking infrastructure (from IP switch 120 to multiviewer 150 via core router 130 and IP switch 140). The impact is particularly important at the core of the IP networking infrastructure. For example, if the core router 130 is simultaneously routing video IP flows for a plurality of destination multiviewers 150, tens or even hundreds of Gbps are wasted due to the scaling operations being performed at the destination multiviewers 150 instead of doing the scaling operations upstream (e.g. at source IP switches 120).

SFP Unit Implementing a Scaling Functionality

Figure 8:
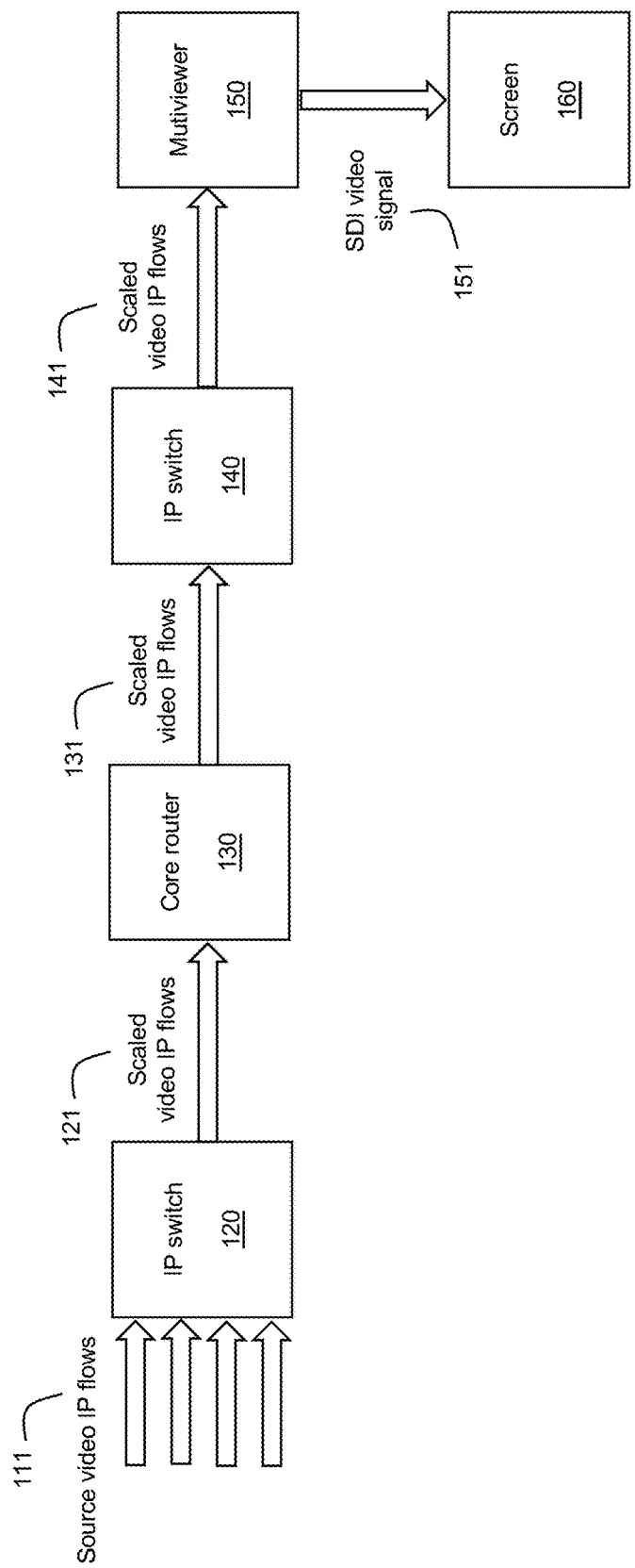
FIG. 8 represents the IP based video distribution system of FIG. 7B adapted for saving bandwidth.

Referring now to FIG. 8, the scaling functionality is implemented upstream from the destination multiviewer 150, and more particularly at the source IP switch 120.

With respect to the previously mentioned example in relation to FIGS. 7B and 7C, the source IP switch 120 receives four source video IP flows 111 respectively transporting a HD video payload requiring a bandwidth of 1.5 Gbps. The four HD video payloads are scaled by a scaling factor of 1/2 (the length and the width of the full size images are both reduced by a ratio of 1/2) at the source IP switch 120, and four corresponding scaled IP flows 121 transporting the scaled HD video payloads are transmitted by the source IP switch 120 to the multiviewer 150, via the core router 130 and the destination IP switch 140. The combined bandwidth required for the transmission of the four scaled IP flows 121, 131 and 141 is 1.5 Gbps—instead of the 6 Gbps required when the scaling operation was performed at the destination multiviewer 150, as illustrated in FIGS. 7B and 7C.

However, the IP switch 120 is a highly specialized equipment, optimized for performing switching and/or routing of IP packets in a very effective manner. Therefore, the IP switch 120 does not have a native scaling functionality. The software of the IP switch 120 may be upgraded to implement a scaling functionality, at the risk of downgrading the performances of its switching and/or routing functionalities, at a potentially prohibitive cost, etc.

In the case of an IP switch 120 having one or more interfaces adapted for receiving a SFP unit, the scaling functionality can be provided by a SFP unit implementing the scaling functionality.

Referring now concurrently to FIGS. 9A to 9E, a SFP unit 200 adapted for being inserted into a chassis of the IP switch 120 of FIG. 8 is represented. The SFP unit 200 corresponds to the SFP unit 10 represented in FIGS. 1 to 6, and comprises the housing 12, the back panel 16 and the front panel 18.

The SFP unit 200 comprises a first connector for receiving a signal comprising a source video payload. The SFP unit 200 comprises a processing unit 210 in the housing 12 implementing a scaling functionality 215. The scaling functionality 215 is implemented by a software executed by the processing unit 210. Alternatively, the scaling functionality 215 is implemented by dedicated hardware component(s) of the processing unit 210 (e.g. one or several Field-Programmable Gate Array (FPGA)). The scaling functionality 215 performs a scaling of the source video payload. The scaling consists in generating a scaled video payload by applying a scaling ratio to the source video payload. The SFP unit 200 comprises a second connector for outputting a video IP flow transporting the scaled video payload.

The source video payload comprises a plurality of source images and the generated scaled video payload comprises a corresponding plurality of scaled images. For each source image, a corresponding scaled image is generated. The generation of the scaled video payload comprises generating the plurality of scaled video images by applying the scaling ratio to the corresponding plurality of source images. Additional data included in the source video payload and not consisting of the source video images are copied into the scaled video payload, and optionally modified if appropriate. Furthermore, additional information related to the scaling operation not included in the source video payload may be included in the scaled video payload (for instance, the value of the scaling ratio).

As mentioned earlier in the description, various scaling ratios can be applied by the scaling functionality 215. In particular, the scaling ratio consists of a single ratio applied to both the length and the width of the plurality of source images. Alternatively, the scaling ratio consists of a combination of a horizontal ratio and a vertical ratio applied respectively to the length and the width of the plurality of source images. The values of the single ratio, horizontal ratio and vertical ratio are generally expressed as 1/N where N is an integer.

For example, if the source video payload comprises source images having a resolution of 1024×1024 and the scaling ratio is a single ratio of 1/2, the scaled video payload comprises scaled images having a resolution of 512×512. If the scaling ratio comprises a horizontal ratio of 1/2 and a vertical ratio of 1/4, the scaled video payload comprises scaled images having a resolution of 512×256.

The scaling operation is also usually referred to as spatial scaling, and consists in reducing the number of pixels in the source images to generate the scaled images, so that the bandwidth required for transmitting the scaled images is reduced accordingly. For instance, a basic algorithm for applying a scaling ratio comprising a horizontal ratio of 1/2 and a vertical ratio of 1/4 consists in keeping every two pixels in the lines of the source images and every 4 pixels in the columns of the source images. More sophisticated algorithms can be implemented for preserving the quality of the resulting scaled images.

Alternatively or complementarily, the scaling operation may also consist in a temporal scaling. For instance, if the multiviewer 150 is used just for confidence monitoring, and does not need to be fluid and to operate in real time, the frame rate is scaled down instead of applying a spatial scaling, and a few images per second are transmitted instead of a real time frame rate of 50-60 images per second.

Figure 9A:
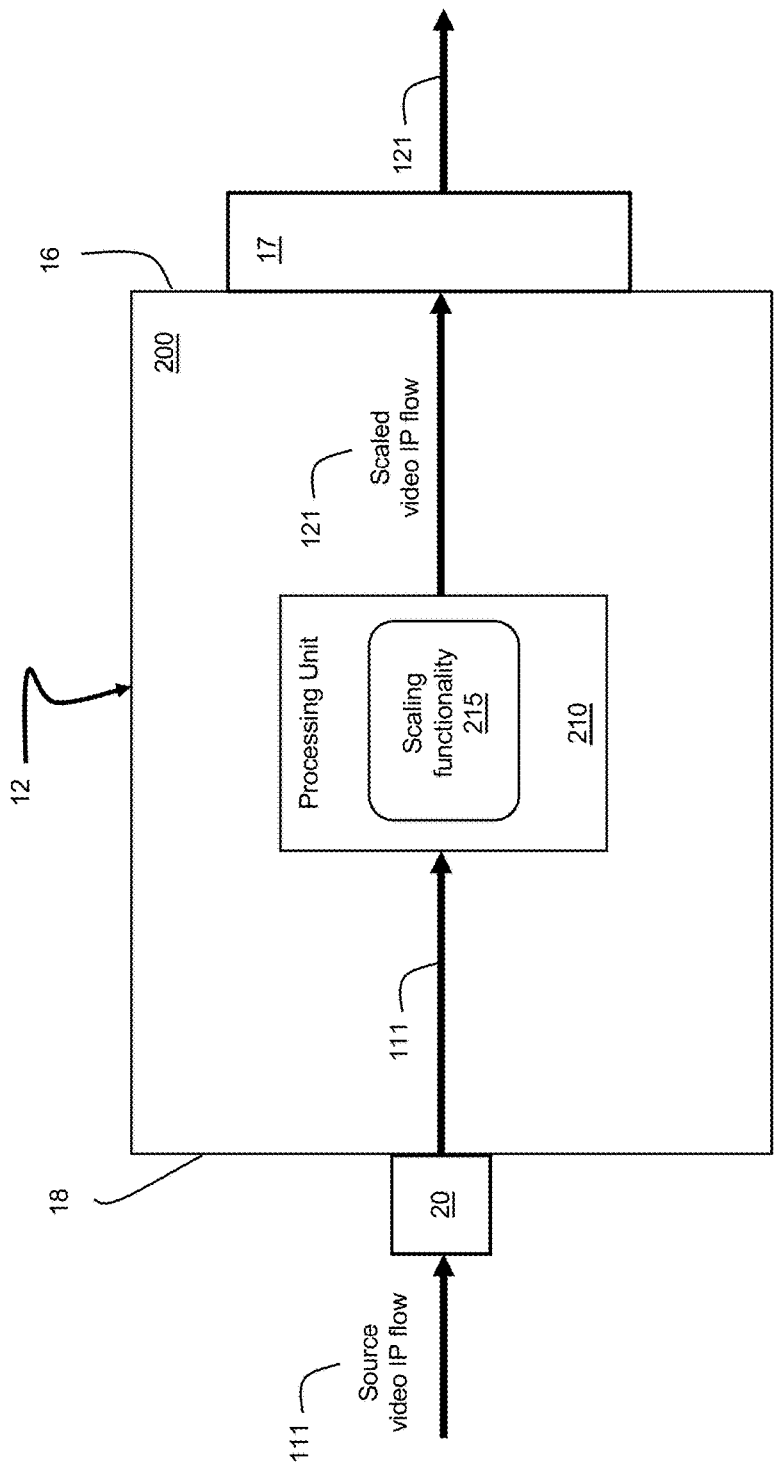
FIGS. 9A to 9E, 10 and 11 represent a simplified exemplary block diagram of an SFP unit with a scaling functionality.

Referring now more particularly to FIG. 9A, the first connector is a front connector 20 located on the front panel 18 of the housing 12. The front connector 20 receives a source video IP flow 111 transporting the source video payload. The front connector 20 (e.g. an optical connector) is adapted for receiving a signal (e.g. an optical signal) transporting the IP packets of the source video IP flow 111. The second connector is a rear connector 17 located on the back panel 16 of the housing 12. The rear connector 17 outputs the scaled video IP flow 121 transporting the scaled video payload. The rear connector 17 (e.g. an electrical connector) is adapted for outputting a signal (e.g. an electrical signal) transporting the IP packets of the scaled video IP flow 121. For example, the source video IP flow 111 is received from the gateway 110 represented in FIG. 7A and the scaled video IP flow 121 is transmitted to the core router 130 represented in FIG. 8.

Figure 9B:
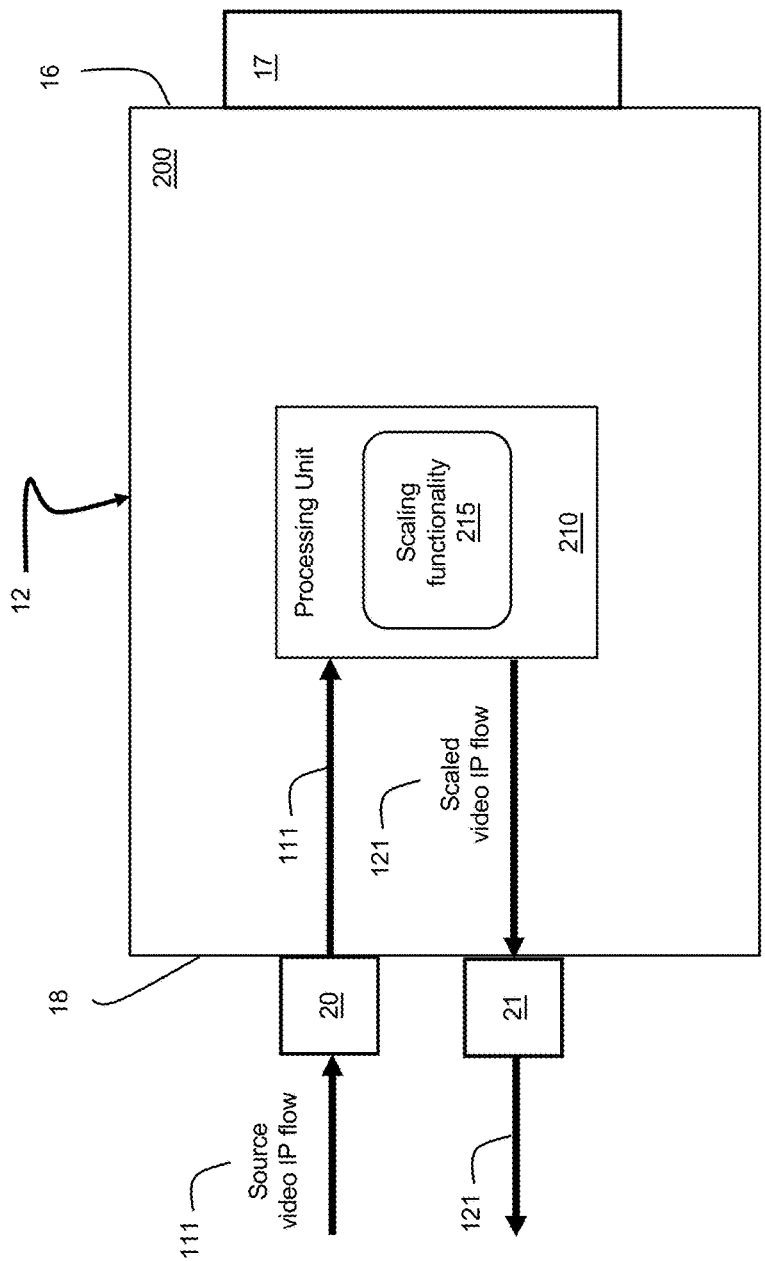

Referring now more particularly to FIG. 9B, the first connector is the front connector 20 of FIG. 9A, located on the front panel 18 of the housing 12 and receiving the source video IP flow 111 transporting the source video payload. The second connector is another front connector 21 located on the front panel 18 of the housing 12. The front connector 21 outputs the scaled video IP flow 121 transporting the scaled video payload. The front connector 21 (e.g. an electrical connector) is adapted for outputting a signal (e.g. an electrical signal) transporting the IP packets of the scaled video IP flow 121.

Figure 9C:
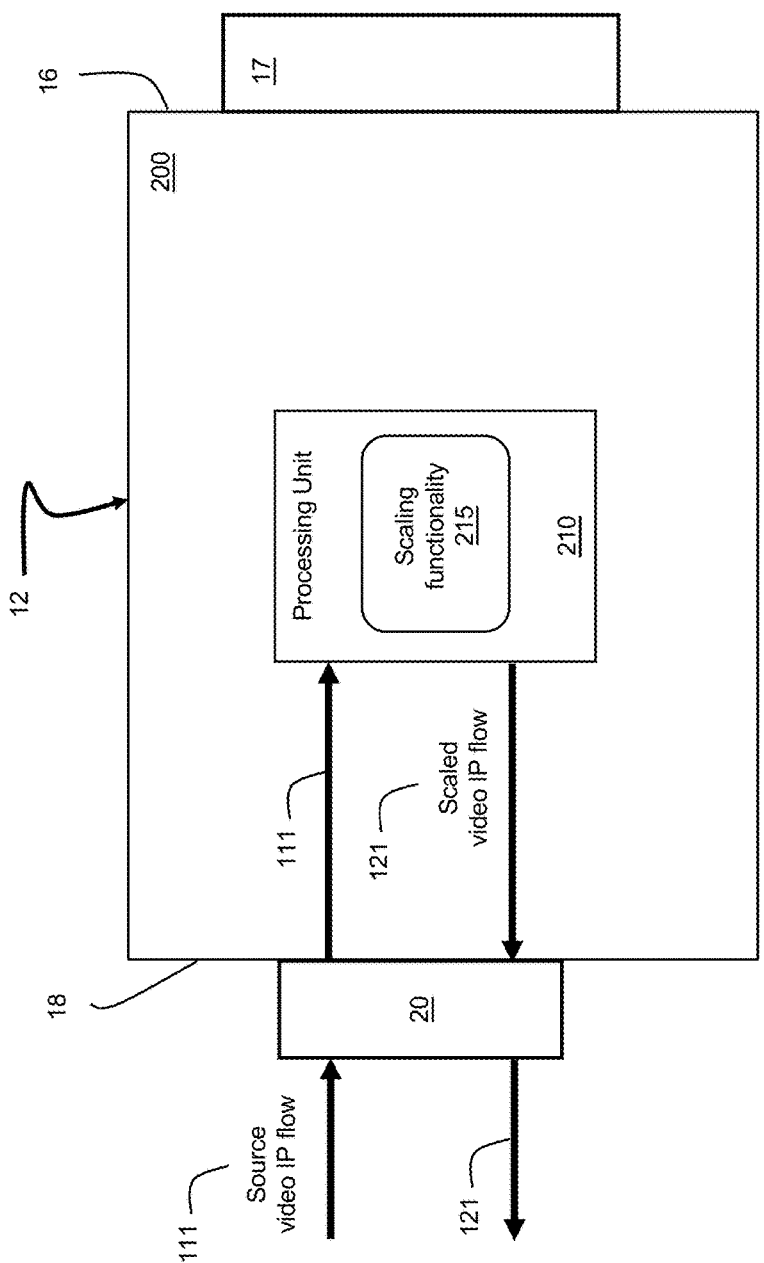

Referring now more particularly to FIG. 9C, the first connector is the front connector 20 of FIG. 9A, located on the front panel 18 of the housing 12 and receiving the source video IP flow 111 transporting the source video payload. The second connector is also the front connector 20. Thus, the front connector 20 simultaneously receives the source video IP flow 111 and outputs the scaled video IP flow 121 transporting the scaled video payload.

Figure 9D:
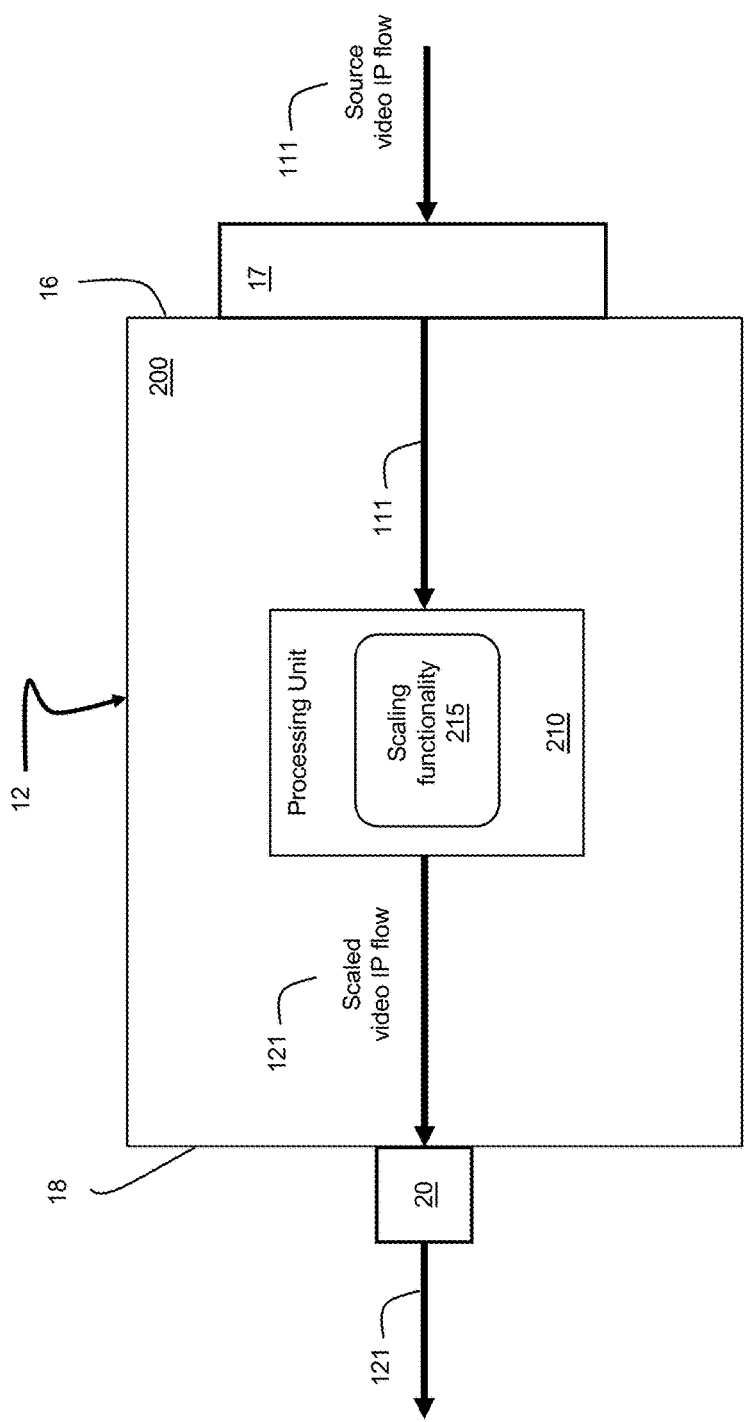

Referring now more particularly to FIG. 9D, the first connector is the rear connector 17 located on the back panel 16 of the housing 12. The rear connector 17 receives the source video IP flow 111 transporting the source video payload. The rear connector 17 (e.g. an electrical connector) is adapted for receiving a signal (e.g. an electrical signal) transporting the IP packets of the source video IP flow 111. The second connector is the front connector 20 located on the front panel 18 of the housing 12. The front connector 20 outputs the scaled video IP flow 121 transporting the scaled video payload. The front connector 20 (e.g. an optical connector) is adapted for outputting a signal (e.g. an optical signal) transporting the IP packets of the scaled video IP flow 121.

Figure 9E:
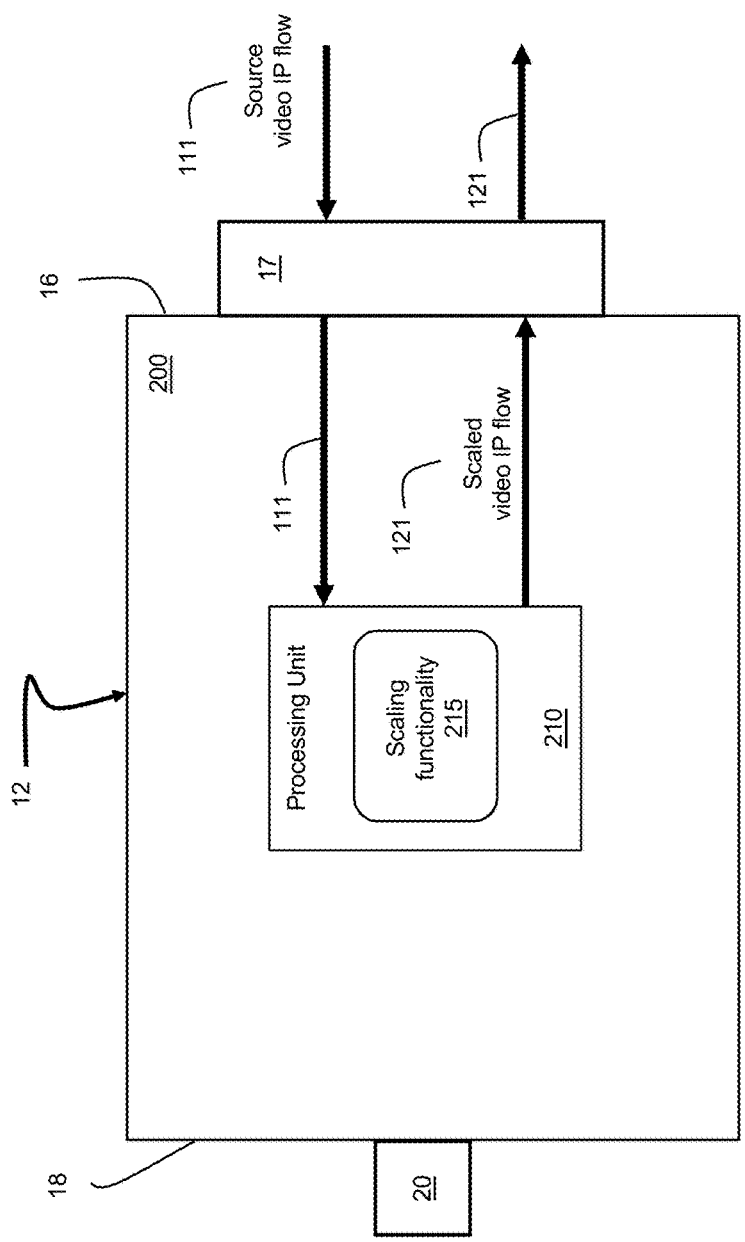

Referring now more particularly to FIG. 9E, the first connector is the rear connector 17 of FIG. 9D, located on the back panel 16 of the housing 12 and receiving the source video IP flow 111 transporting the source video payload. The second connector is also the rear connector 17. Thus, the rear connector 17 simultaneously receives the source video IP flow 111 and outputs the scaled video IP flow 121 transporting the scaled video payload.

The front connector 20 (and optionally 21) consists of an electrical or optical connector, adapted for receiving and/or outputting a signal transporting an IP flow over respectively an electrical or optical cable connected to the SFP unit 200 via the connector 20. The transported IP flow has a physical layer adapted for the transport of IP packets, such as Ethernet, Synchronous Optical Networking (SONET)/Synchronous Digital Hierarchy (SDH), etc.

As mentioned earlier in the description, the source video payload may consist of an SDI video payload transported in the source video IP flow 111. Furthermore, the SDI video payload may be compliant with at least one of the following SMPTE standards: the SMPTE 2022-5 standard, the SMPTE 2022-6 standard, and the SMPTE 2022-7 standard.

Alternatively, the first connector 20 represented in FIGS. 9A and 9B is a SDI connector receiving a SDI signal transporting a SDI video payload. The SDI video payload is processed by the scaling functionality 215 to generate the scaled video payload transported by the scaled video IP flow 121 outputted by the second connector (rear connector 17 in FIG. 9A and front connector 21 in FIG. 9B). The first connector 20 is directly connected to the video source 100 represented in FIG. 7A (there is no intermediate gateway 110), which generates the SDI video signal received by connector 20. In a particular configuration, the SFP unit 200 is inserted into a chassis of the gateway 110 represented in FIG. 7A (instead of being inserted in the IP switch 120). The first connector of the SFP unit 200 is the SDI connector directly connected to the video source 100, and receiving the SDI signal transporting the SDI video payload. The second connector of the SFP unit 200 outputs the scaled video IP flow, which is transmitted to the IP switch 120. In another configuration, the functionalities of the gateway 110 and the IP switch 120 are integrated in a single equipment, capable of receiving the SFP unit 200 for implementing the scaling functionality 215.

Figure 10:
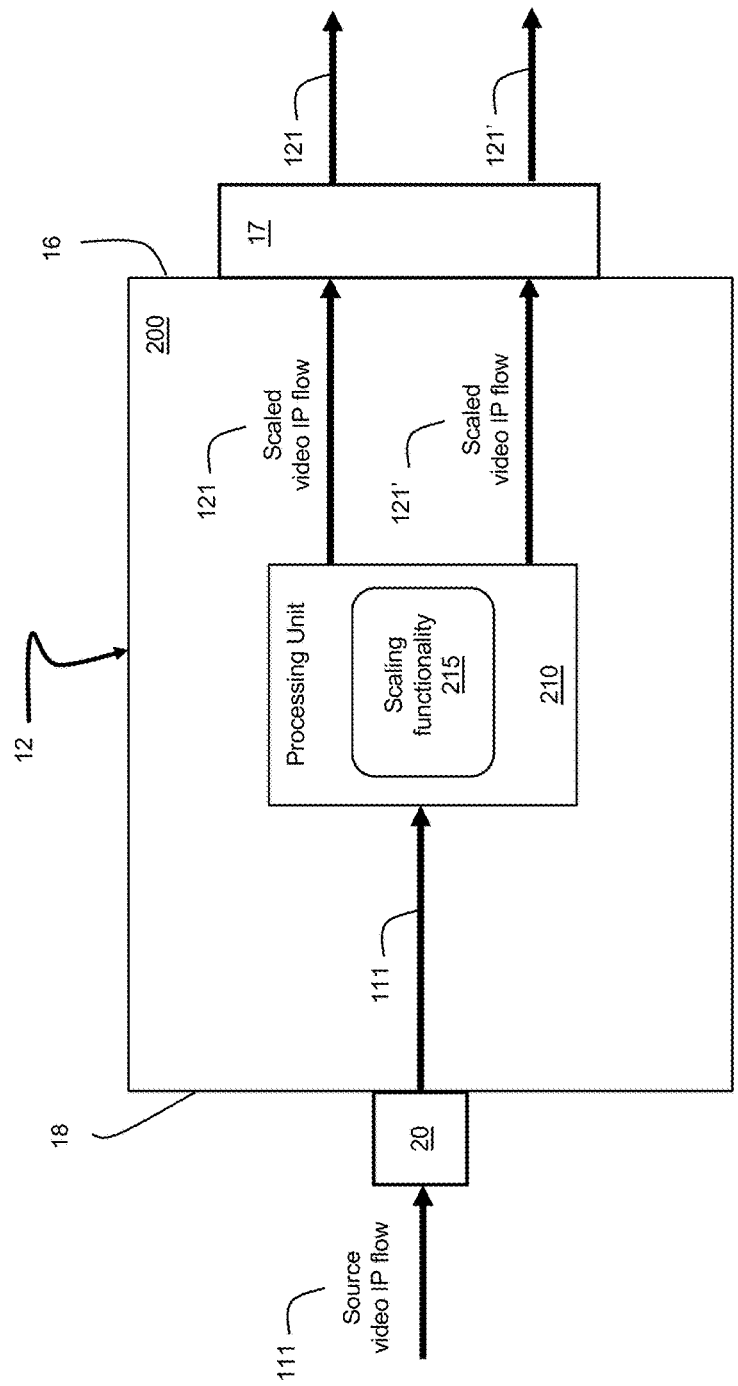

Reference is now made to FIG. 10, which represents the generation by the scaling functionality 215 of a plurality of scaled video payloads based on a single source video payload (received via the first connector). The scaling functionality 215 applies a particular scaling ratio to the source video payload for generating each of the plurality of scaled video payloads. The second connector outputs a plurality of scaled video IP flows for respectively transporting the plurality of scaled video payloads.

For example, as illustrated in FIG. 10, the front connector 20 of the SFP unit 200 receives the source video IP flow 121 transporting the source video payload. The scaling functionality 215 generates a first scaled video payload applying a first particular scaling ratio (e.g. 1/2), and outputs the first scaled video payload via the rear connector 17 in a first scaled video IP flow 121. The scaling functionality 215 generates a second scaled video payload applying a second particular scaling ratio (e.g. horizontal ratio of 1/2 and vertical ratio of 1/4), and outputs the second scaled video payload via the rear connector 17 in a second scaled video IP flow 121'.

Each of the plurality of scaled video IP flows (e.g. 121 and 121') is a unicast IP flow having a particular destination IP address. Alternatively, the plurality of unicast scaled video IP flows have the same destination IP address, but have different destination ports. The one or more destination IP address(es) belong to the destination multiviewer 150 of FIG. 8.

Alternatively, each of the plurality of scaled video IP flows (e.g. 121 and 121') is a dedicated multicast IP flow. A plurality of destination multiviewers 150 (similar to the one represented in FIG. 8) can simultaneously receive one or more of the dedicated multicast IP flows. For instance, a first multiviewer registers to the multicast group corresponding to the scaled video IP flow 121, a second multiviewer registers to the multicast group corresponding to the scaled video IP flow 121', and a third multiviewer registers to the multicast groups corresponding to the scaled video IP flows 121 and 121'. The processing unit 210 implements a multicast functionality, for generating the multicast IP flows, and managing the registrations/unregistrations of the multiviewers to the various multicast groups. Alternatively, the management of the registrations/unregistrations of the multiviewers to the various multicast groups is performed on another networking equipment.

Referring back to FIGS. 9A to 9E, the SFP unit 200 may receive a plurality of source signals, each source signal comprising a specific source video payload. For instance, the front connector 20 of FIG. 9A, 9B or 9C or the rear connector 17 of FIG. 9D or 9E receives the plurality of source IP flows. The plurality of source IP flows can also be received on several front connectors (e.g. 20 and 21) of the SFP unit 200. The scaling operation performed by the scaling functionality 215 consists in generating a plurality of scaled video payloads by applying a specific scaling ratio to each of the plurality of specific source video payloads. The SFP unit 200 outputs a plurality of IP flows respectively transporting one of the plurality of scaled video payloads. For instance, the rear connector 17 of FIGS. 9A and 9E, the front connector 21 of FIG. 9B or the front connector 20 of FIGS. 9C and 9D outputs the plurality of scaled video IP flows 121.

Figure 11:
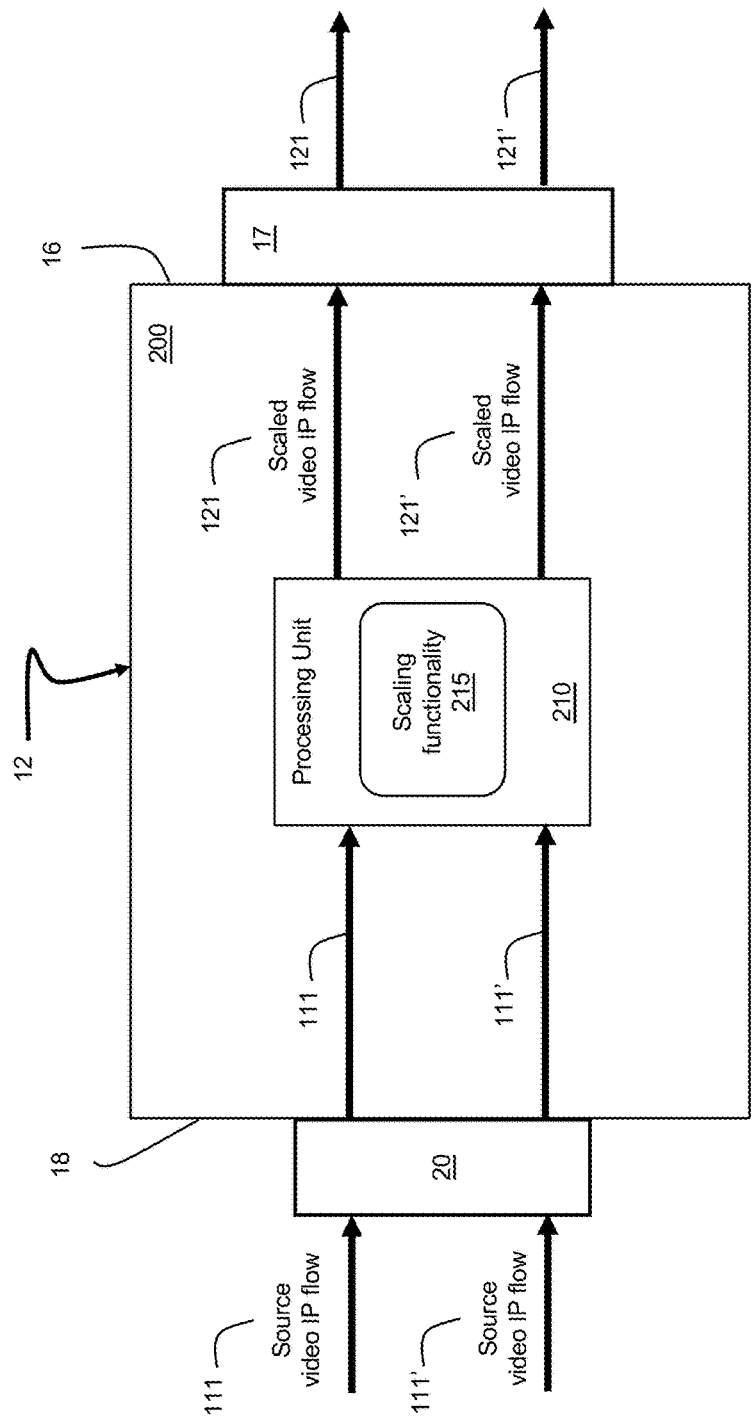

Reference is now made to FIG. 11, which illustrates the scaling of two source video IP flows received simultaneously by the SFP unit 200. The front connector 20 receives a first source video IP flow 111 comprising a first source video payload. The scaling functionality 215 generates a first scaled video payload applying a first specific scaling ratio (e.g. 1/4), and outputs the first scaled video payload via the rear connector 17 in a first scaled video IP flow 121. The front connector 20 receives a second source video IP flow 111' comprising a second source video payload. The scaling functionality 215 generates a second scaled video payload applying a second particular scaling ratio (e.g. horizontal ratio of 1/4 and vertical ratio of 1/2), and outputs the second scaled video payload via the rear connector 17 in a second scaled video IP flow 121'. The plurality of source video IP flows (e.g. 111, 111') received by the SFP unit 200 may be unicast only, multicast only, or a combination of unicast and multicast IP flows.

Furthermore, for each source video payload received by the SFP unit 200, a plurality of scaled video IP flows may be generated for transporting a plurality of scaled video payloads having each a particular scaling ratio, as illustrated in FIG. 10.

As mentioned previously in the description, the signal received by the SFP unit 200 may comprise an additional source payload (in addition to the source video payload). The additional source payload comprises one of the following: an audio payload, a metadata payload, a combination thereof, etc. The metadata payload comprises at least one of the following: closed caption text, subtitle text, and rating text. The scaled video IP flow outputted by the SFP unit 200 further transports the additional source payload, in addition to the scaled video payload. The additional source payload may be modified by the scaling functionality 215, before being outputted in the scaled video IP flow. In a particular configuration, the audio payload and/or metadata payload are transported independently of the source video payload, and are not processed by the scaling functionality 215.

The processing unit 210 may execute additional functionalities, prior to or after executing the scaling functionality 215. Some of the additional functionalities may be executed by another processing unit (not represented in the Figures) of the SFP unit 200, instead of being also executed by the processing unit 210.

For example, the processing unit 210 also executes a de-interlacing functionality (not represented in the Figures). The source video payload received by the SFP unit 200 is interlaced and the scaled video payload outputted in the scaled video IP flow by the SFP unit 200 is de-interlaced. More specifically, each source image of the source video payload is interlaced, and each corresponding scaled image of the scaled video payload is de-interlaced. The operation consisting in de-interlacing an image is well known in the art. The received source video payload is first de-interlaced by the de-interlacing functionality, and then scaled by the scaling functionality 215, to generate the de-interfaced scaled video payload. Alternatively, the received source video payload is first scaled by the scaling functionality 215, and then de-interlaced by the de-interlacing functionality, to generate the de-interfaced scaled video payload.

In another example, the signal received by the SFP unit 200 comprises an additional source payload comprising an audio payload. The processing unit 210 further determines a peak audio level of the audio payload, and the peak audio level is transported in the scaled video IP flow outputted by the SFP unit 200.

In still another example, the source video payload is in a High Definition (HD) format with a higher resolution (e.g. 1080p), and the scaled video payload is in a HD format with a lower resolution (e.g. 720p or 1080i). The processing unit 210 further performs a conversion of the higher resolution HD format of the source video payload into the lower resolution HD format of the scaled video payload. The conversion from the higher resolution HD format to the lower resolution HD format can be performed before or after executing the scaling functionality 215.

The operations of the scaling functionality 215 can be remotely controlled. For this purpose, the SFP unit 200 receives a control message from a third party computing device (not represented in the Figures). The control message defines at least one of the following: a scaling ratio, an identification of a source video payload, and characteristics of an IP flow transporting a scaled video payload.

For example, a control message comprises an identification of a source video IP flow (e.g. source and destination IP addresses, source and destination ports), a particular scaling ratio and characteristics of a scaled video IP flow (e.g. destination address and destination port, or multicast group). Upon reception of this command, the scaling functionality 215 starts generating a scaled video payload in accordance with the scaling factor provided in the control message, using a source video payload transported by the source video IP flow identified in the control message. A scaled video IP flow transporting the scaled video payload and having the characteristics specified in the control message is outputted by the SFP unit 200.

In another example, a control message comprises an identification of a source video IP flow (e.g. source and destination IP addresses, source and destination ports), a particular scaling ratio and a STOP parameter. Upon reception of this command, the scaling functionality 215 stops generating the scaled video payload corresponding to the particular scaling factor, using the identified source video payload transported by the source video IP flow.

Optimization strategies to optimize the video distribution network can be implemented via the control messages: only image scales that need to be displayed at a multiviewer 150 are generated by the scaling functionality 215, and injected in the network. For example, if the multiviewer 150 only needs a low bit rate version of a source video IP flow, then the corresponding specific scale is generated by the scaling functionality 215 and made available in the network. In another example, if the multiviewer 150 needs a full screen version of a source video IP flow, then an unscalled version of the video IP flow is made available in the network.

The third party computing device for controlling the operations of the scaling functionality 215 includes a user interface, allowing a user to enter user commands. The user commands are processed by the third party computing device to generate the control message transmitted to the SFP unit 200. The control message can be transported via the IP protocol. Upon reception of the control message (e.g. via the front connector 20 of the SFP unit 200), the processing unit 210 interprets the received control message, and controls the operations of the scaling functionality 215 accordingly. The control message may be compliant with a standardized Control Plane Signaling protocol, such as the Simple Network Management Protocol (SNMP), OpenFlow, etc. Alternatively, the control message is compliant with a proprietary Control Plane Signaling protocol.

The source video IP flows received by the SFP unit 200 and the scaled video IP flows outputted by the SFP unit 200 may use the IPv4 protocol, the IPv6 protocol, or a combination thereof.

The final destination of the scaled video IP flows outputted by the SFP unit 200 is one or more multiviewer(s). However, their final destination may also include other types of equipment capable of receiving and processing scaled video IP flows.

Figure 12:
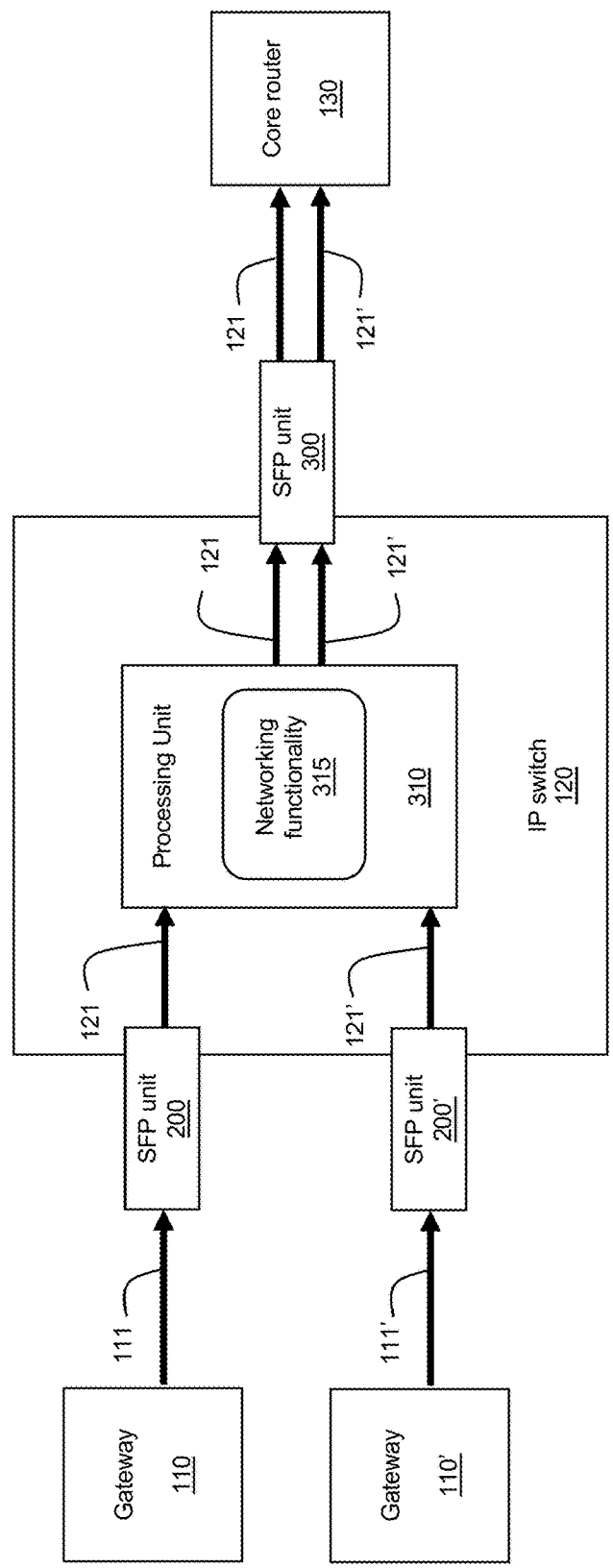
FIG. 12 represents two SFP units with the scaling functionality inserted into an IP switch.

Reference is now made to FIG. 12, which illustrates the usage of a plurality of the SFP unist 200 with scaling capabilities represented in FIGS. 9A to 11 in the IP switch 120 represented in FIGS. 7A, 7B and 8.

Two SFP units with scaling functionalities 200 and 200' are inserted in a chassis of the IP switch 120. However, the number of SFP units with scaling functionalities inserted in the chassis may vary based on the number of SFP units that the IP switch 120 is capable of receiving.

SFP unit 200 receives a first source video IP flow 111 via a front connector (not represented in FIG. 12 for simplification purposes) from a gateway 110. SFP unit 200' receives a second source video IP flow 111' via a front connector (not represented in FIG. 12 for simplification purposes) from a gateway 110'. The gateways 110 and 110' correspond to the gateway 110 represented in FIG. 7A.

SFP unit 200 processes the source video IP flow 111 to generate a scaled video IP flow 121, as detailed previously in the description. The scaled video IP flow 121 is outputted by a rear connector (not represented in FIG. 12 for simplification purposes) of SFP unit 200. Similarly, SFP unit 200' processes the source video IP flow 111' to generate a scaled video IP flow 121'. The scaled video IP flow 121' is outputted by a rear connector (not represented in FIG. 12 for simplification purposes) of SFP unit 200'.

The IP switch 120 comprises a processing unit 310 implementing a networking functionality 315 (e.g. switching and/or routing). The processing unit 310 receives the scaled video IP flows 121 and 121', and the networking functionality 315 processes the scaled video IP flows 121 and 121', as is known in the art.

The processing unit 310 further transmits the scaled video IP flows 121 and 121' to another SFP unit 300 inserted in the chassis of the IP switch 120. The scaled video IP flows 121 and 121' are received by a rear connector (not represented in FIG. 12 for simplification purposes) of the SFP unit 300 and outputted by a front connector (not represented in FIG. 12 for simplification purposes) of the SFP unit 300, for transmission to the core router 130. The core router 130 corresponds to the core router 130 represented in FIGS. 7A, 7B and 8.

In an exemplary configuration, the SFP units 200 and 200' have one or more front connectors of electrical or optical type with a bandwidth of 10 Gbps per connector. The SFP units 200 and 200' are connected on edge ports (providing access to an edge IP network comprising the gateways 110 and 110') of the IP switch 120. The SFP unit 300 has four front connectors (Quad SFP) of electrical or optical type with an aggregate bandwidth of 40 Gbps. The SFP unit 300 is connected on a core port (providing access to a core IP network comprising the core router 130) of the IP switch 120.

As mentioned previously in the description, the SFP units 200, 200' and 300 may be inserted into other types of equipment, such as the gateways 100 and 100', etc. For instance, when inserted into the gateways 100 and 100', the SFP units 200 and 200' have at least one SDI connector for directly receiving SDI video signals from video sources 100 similar to those represented in FIG. 7A. In an alternative configuration, the SFP units 200 and 200' are only physically connected to a receiving equipment (e.g. the IP switch 120) via a rear connector of the SFP units 200 and 200', but do not exchange data with a processing unit (e.g. 310) of the receiving equipment. The SFP units 200 and 200' receive the incoming video IP flows 111 and 111' via at least one front connector, and output the generated scaled video IP flows 121 and 121' via at least one (identical to, or different from, the receiving one) front connector.

The scaling functionality 215 represented in FIGS. 9A to 12 may be implemented in another equipment than the SFP unit 200. For example, the IP switch 120 or the gateway 110 directly implement the scaling functionality 215 without resorting to a SFP unit 200 for providing this functionality. Any computing device (e.g. SFP unit 200, IP switch 120, etc.) implementing the scaling functionality 215 operates according to a method for scaling a source video payload into a plurality of scaled video payloads transported by a plurality of IP flows. The method comprises the following steps.

A first step consists in receiving a signal comprising the source video payload via an input unit of the computing device.

A second step consists in performing a scaling of the source video payload by a processing unit of the computing device. The scaling consists in generating a plurality of scaled video payloads by applying a particular scaling ratio to the source video payload for each of the plurality of scaled video payloads. This step is illustrated in FIG. 10 for the SFP unit 200.

A third step consists in outputting the plurality of IP flows respectively transporting the plurality of scaled video payloads via an output unit of the computing device. This step is also illustrated in FIG. 10 for the SFP unit 200.

Additionally, the method provides for simultaneously scaling a plurality of source video payloads. For this purpose, the input unit receives a plurality of signals. Each signal comprises a specific source video payload. The processing unit concurrently performs the scaling of each of the specific source video payloads. This capability is illustrated in FIG. 11 for the SFP unit 200.

The method may comprise any additional step corresponding to a functionality of the SFP unit 200 having the scaling functionality 215, which has been previously detailed in the description.

Figure 13:
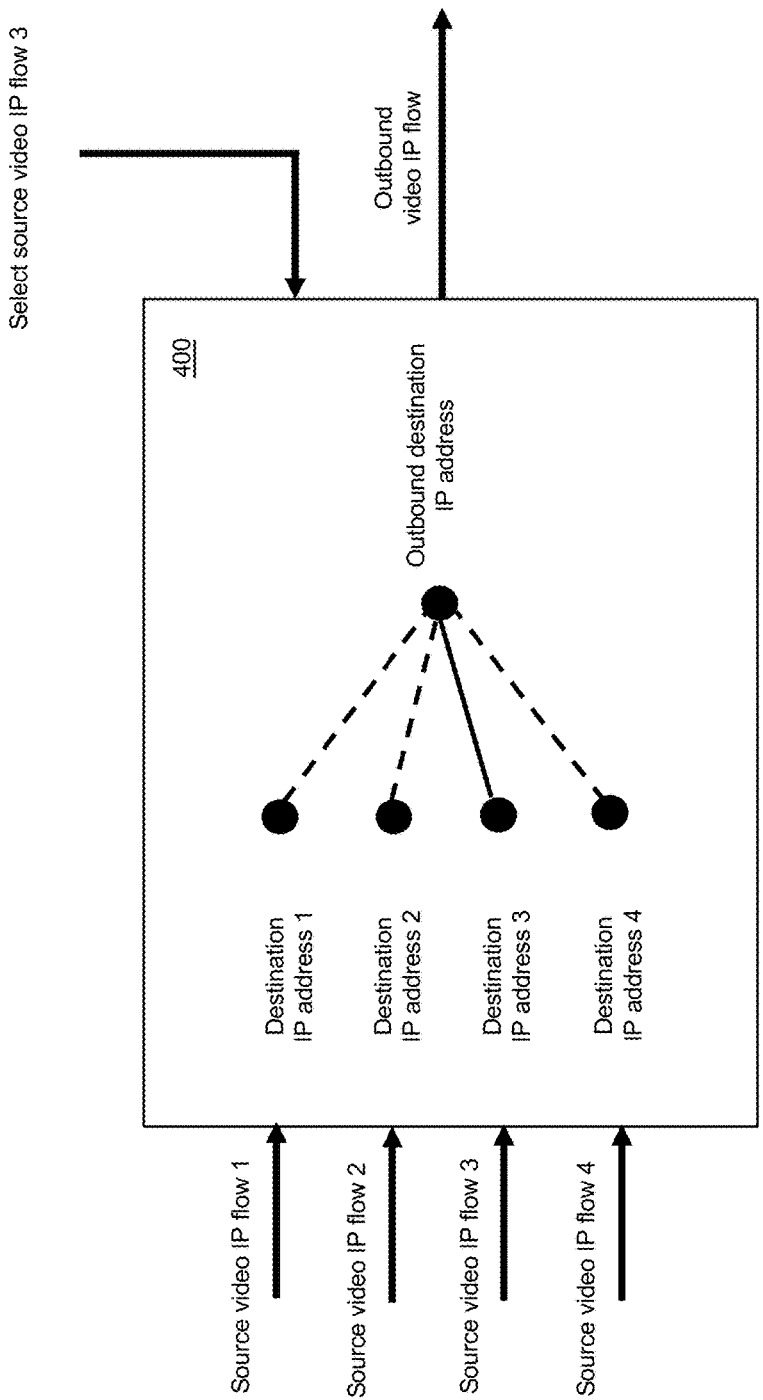
FIGS. 13, 14A to 14E and 15 represent an SFP unit implementing a selection functionality between a plurality of source video IP flows.

SFP Unit Implementing a Selection Functionality Between a Plurality of Source Video IP Flows Referring now to FIG. 13, a SFP unit 400 adapted for being inserted into a chassis of a hosting unit, and implementing a selection functionality, is represented. The SFP unit 400 receives a plurality of source video IP flows. Four source video IP flows have been represented in FIG. 13 for illustration purposes only. The number of source video IP flows received by the SFP unit 400 is greater than two, and only limited by the bandwidth occupied by the source video IP flows and the capabilities of the SFP unit 400.

Each received source video IP flow has a different destination IP address (e.g. destination IP addresses 1, 2, 3 and 4 in FIG. 13). Alternatively, at least two source video IP flows may have the same destination IP address, but different destination ports.

The SFP unit 400 selects one of the source video IP flows and transmits a video payload of the selected source video IP flow via an outbound video IP flow having pre-defined characteristics. The pre-defined characteristics include the destination IP address of the outbound video IP flow, which is different from any of the destination IP addresses of the source video IP flows.

Control messages are transmitted by a third party computing device (not represented in FIG. 13 for simplification purposes) for remotely controlling the operations of the SFP unit 400, as will be detailed later in the description. For example, as illustrated in FIG. 13, the SFP unit 400 receives a control message for selecting the source video IP flow 3. The control message is received via a front connector or a rear connector of the SFP unit 400.

Referring now concurrently to FIGS. 14A to 14E, various configurations of the SFP unit 400 implementing the selection functionality are represented. The SFP unit 400 corresponds to the SFP unit 10 represented in FIGS. 1 to 6, and comprises the housing 12, the back panel 16 and the front panel 18.

The SFP unit 400 comprises a first connector for receiving the plurality of source video IP flows, each source video IP flow transporting a source video payload. Only two source video IP flows 511 and 511' have been represented in FIGS. 14A to 14E for simplification purposes, but a greater number of source video IP flows may be received via the first connector.

The SFP unit 400 comprises memory 420 in the housing 12 for storing the characteristics 425 of the outbound video IP flow 521. The characteristics 425 comprise the destination IP address of the outbound video IP flow 521 (also referred to as the outbound destination IP address). As mentioned previously, the destination IP address of the outbound video IP flow 521 differs from the destination IP addresses of the plurality of received source video IP flows (e.g. 511 and 511'). The characteristics 425 are only represented in FIG. 14A for simplification purposes.

The SFP unit 400 comprises a processing unit 410 in the housing 12 implementing a selection functionality 415. The selection functionality 415 is implemented by a software executed by the processing unit 410. The selection functionality 415 selects one among the plurality of received source video IP flows (e.g. 511 or 511'), and generates outbound IP packets of the outbound video IP flow 521. The outbound IP packets transport the source video payload of the selected source video IP flow (e.g. 511 or 511'). For example, if the source video IP flow 511 is selected, the selection functionality 415 processes the IP packets of the source video IP flow 511 and drops the IP packets of the source video IP flow 511'.

The processing of the IP packets of the source video IP flow 511 may simply consist in changing their destination IP address to the destination IP address of the outbound video IP flow 521 stored in memory 420. The destination port is either kept, or changed to a specific outbound destination port. If a specific outbound destination port is used, it is stored in memory 420 as part of the characteristics 425 of the outbound video IP flow 521.

Alternatively, the processing of the IP packets of the source video IP flow 511 further includes extracting the source video payload and processing the source video payload. Examples of processing of the source video payload include compressing the source video payload, uncompressing the source video payload, scaling the source video payload (as detailed previously in the description), monitoring the quality of the source video payload, etc. The processed source video payload is transported in outbound IP packets of the outbound video IP flow 521 generated by the processing unit 410. As mentioned previously, the characteristics of the outbound IP packets of the outbound video IP flow 521 differ from the characteristics of the IP packets of the source video IP flow 511 at least by their destination IP address (set to the outbound destination IP address stored in memory 420), and optionally also by their destination port (set to the outbound destination port stored in memory 420).

The SFP unit 400 comprises a second connector for outputting the outbound IP packets of the outbound video IP flow 521.

Although represented as independent of the processing unit 410 in the Figures, the memory 420 may also be integrated to the processing unit 410.

Figure 14A:
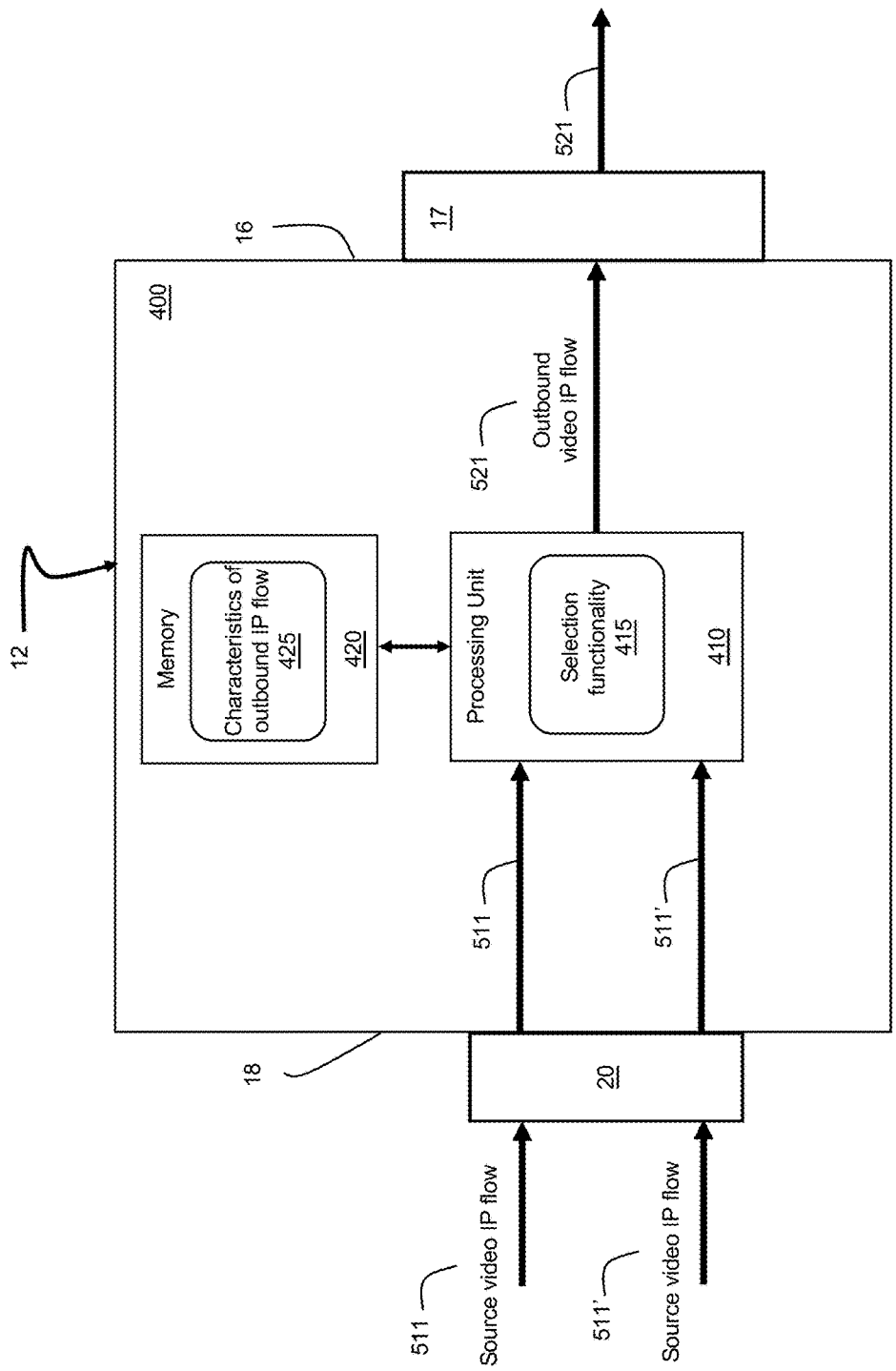

Referring now more particularly to FIG. 14A, the first connector is a front connector 20 located on the front panel 18 of the housing 12. The front connector 20 receives the plurality of source video IP flows (e.g. 511 and 511') transporting the source video payloads. The front connector 20 (e.g. an optical connector) is adapted for receiving signals (e.g. optical signals) transporting the IP packets of the plurality of source video IP flows (e.g. 511 and 511'). The second connector is a rear connector 17 located on the back panel 16 of the housing 12. The rear connector 17 outputs the outbound video IP flow 521 transporting the video payload of the source video IP flow (e.g. 511) selected by the selection functionality 415. The rear connector 17 (e.g. an electrical connector) is adapted for outputting a signal (e.g. an electrical signal) transporting the IP packets of the outbound video IP flow 521.

Figure 14B:
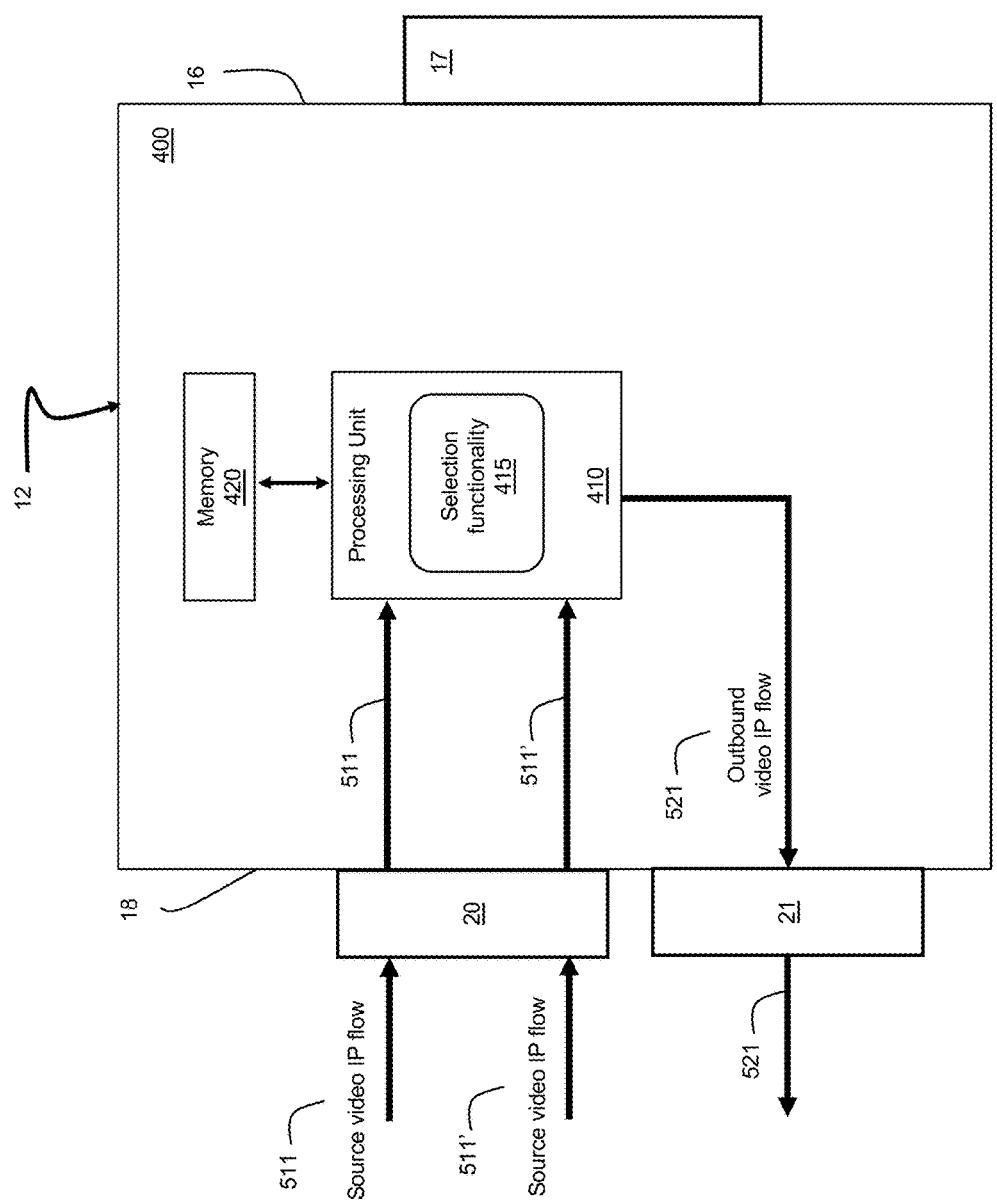

Referring now more particularly to FIG. 14B, the first connector is the front connector 20 of FIG. 14A, located on the front panel 18 of the housing 12 and receiving the plurality of source video IP flows (e.g. 511 and 511') transporting the source video payloads. The second connector is another front connector 21 located on the front panel 18 of the housing 12. The front connector 21 outputs the outbound video IP flow 521 transporting the video payload of the source video IP flow (e.g. 511) selected by the selection functionality 415. The front connector 21 (e.g. an electrical connector) is adapted for outputting a signal (e.g. an electrical signal) transporting the IP packets of the outbound video IP flow 521.

Figure 14C:
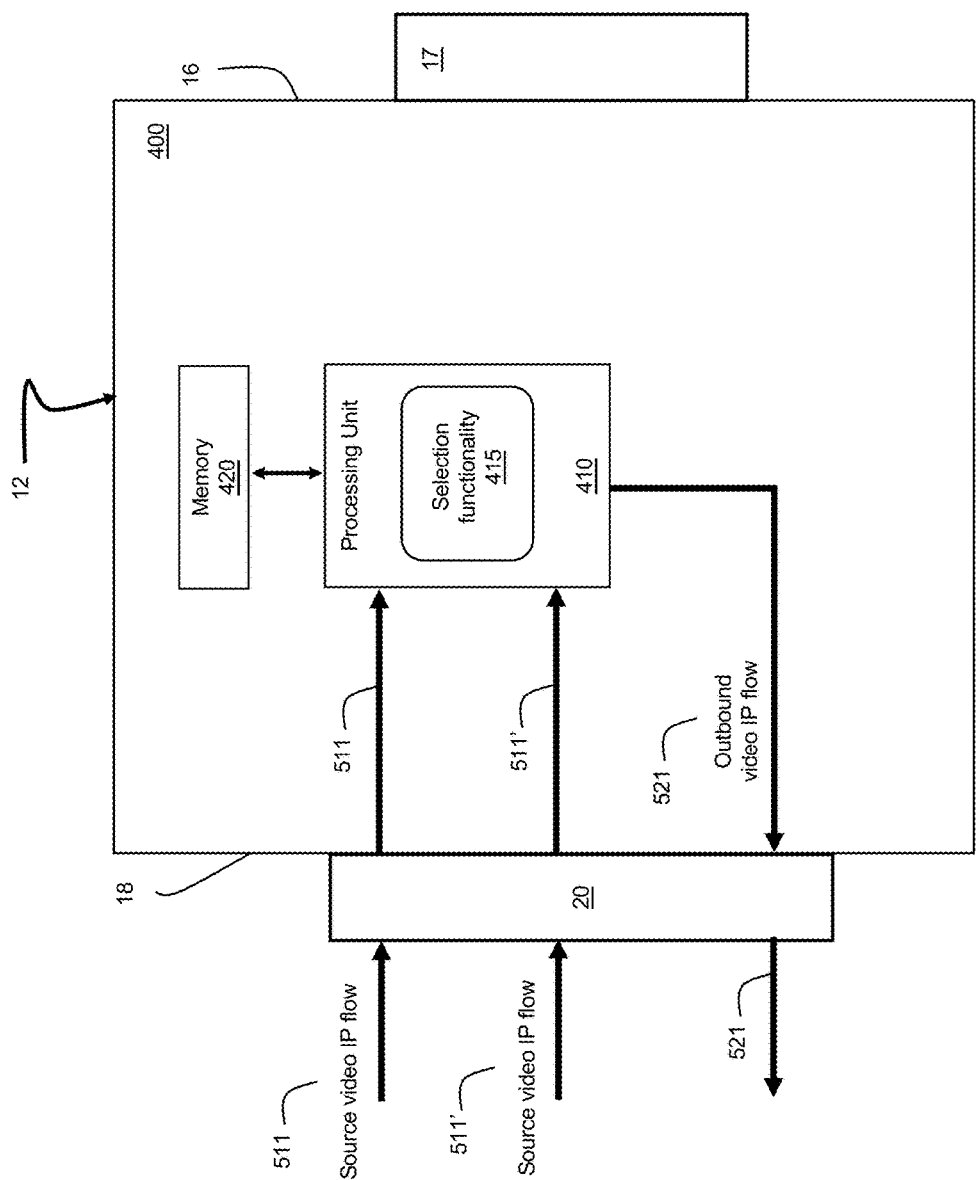

Referring now more particularly to FIG. 14C, the first connector is the front connector 20 of FIG. 14A, located on the front panel 18 of the housing 12 and receiving the plurality of source video IP flows (e.g. 511 and 511') transporting the source video payloads. The second connector is also the front connector 20. Thus, the front connector 20 simultaneously receives the plurality of source video IP flows (e.g. 511 and 511') and outputs the outbound video IP flow 521 transporting the video payload of the source video IP flow (e.g. 511) selected by the selection functionality 415.

Figure 14D:
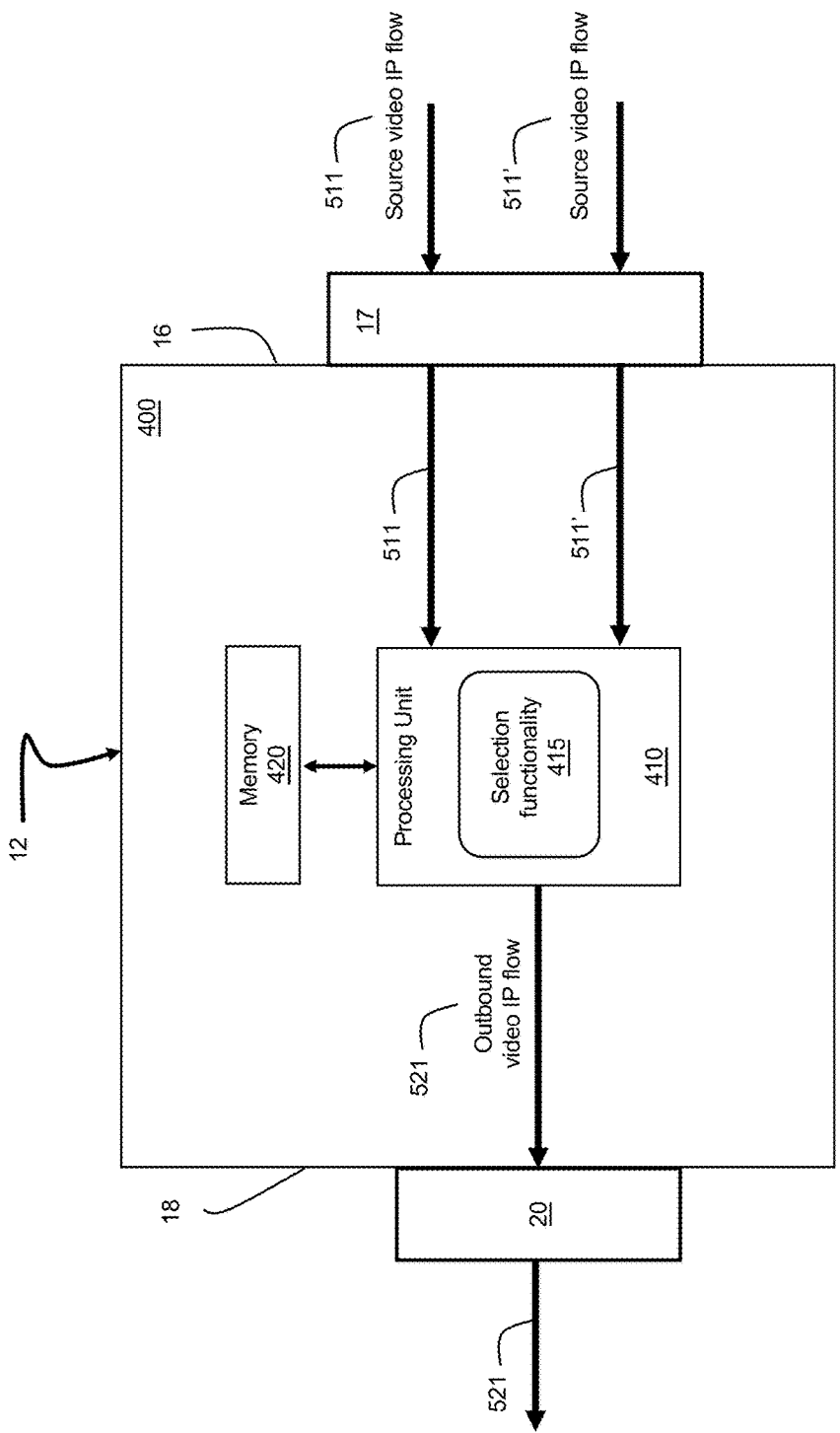

Referring now more particularly to FIG. 14D, the first connector is the rear connector 17 located on the back panel 16 of the housing 12. The rear connector 17 receives the plurality of source video IP flows (e.g. 511 and 511') transporting the source video payloads. The rear connector 17 (e.g. an electrical connector) is adapted for receiving signals (e.g. electrical signals) transporting the IP packets of the source video IP flows (e.g. 511 and 511'). The second connector is the front connector 20 located on the front panel 18 of the housing 12. The front connector 20 outputs the outbound video IP flow 521 transporting the video payload of the source video IP flow (e.g. 511) selected by the selection functionality 415. The front connector 20 (e.g. an optical connector) is adapted for outputting a signal (e.g. an optical signal) transporting the IP packets of the outbound video IP flow 521.

Figure 14E:
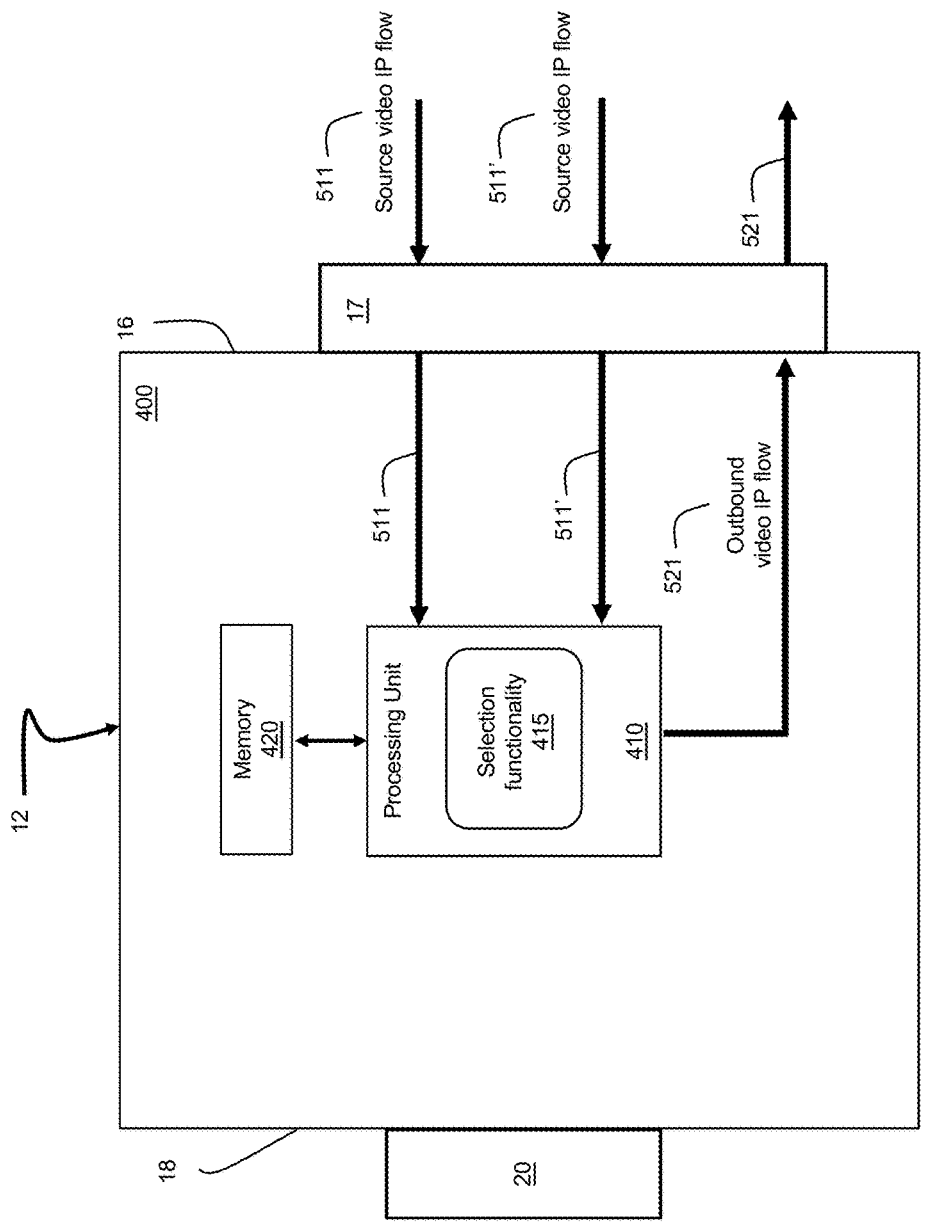

Referring now more particularly to FIG. 14E, the first connector is the rear connector 17 of FIG. 14D, located on the back panel 16 of the housing 12 and receiving the plurality of source video IP flows (e.g. 511 and 511') transporting the source video payloads. The second connector is also the rear connector 17. Thus, the rear connector 17 simultaneously receives the plurality of source video IP flows (e.g. 511 and 511') and outputs the outbound video IP flow 521 transporting the video payload of the source video IP flow (e.g. 511) selected by the selection functionality 415.

Figure 15:
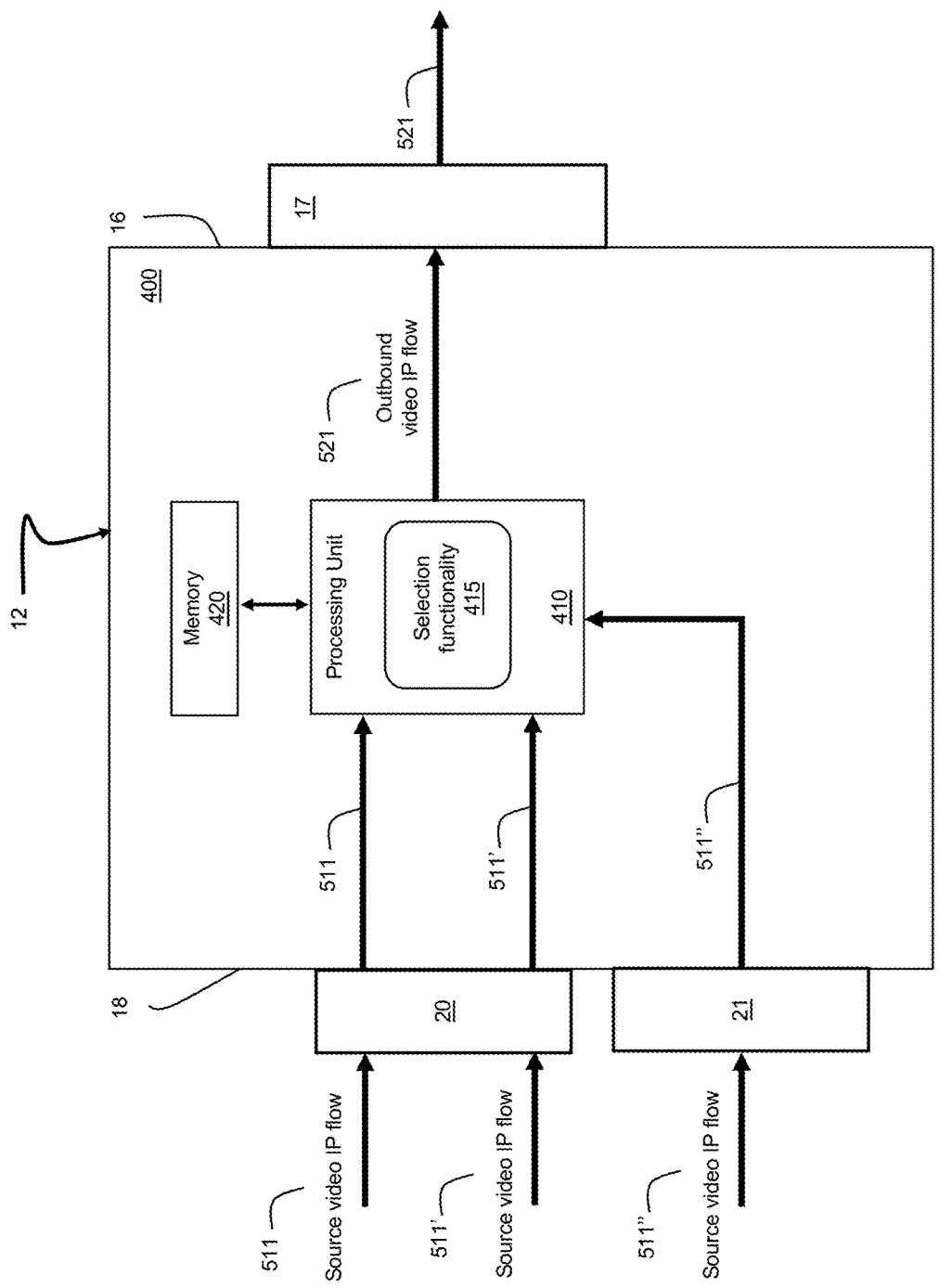

Referring now to FIG. 15, a configuration of the SFP unit 400 where the plurality of source video IP flows is received via more than one front connector is represented. For illustration purposes, the front connector 20 receives two source video IP flows 511 and 511', and the front connector 21 receives one source video IP flow 511". The number of source video IP flows received by each of the front connectors 20 and 21 may vary, and the number of front connectors for receiving the source video IP flows may be greater than two. In FIG. 15, the outbound video IP flow 521 is outputted by the rear connector 17. Alternatively, the outbound video IP flow 521 is outputted by one of the front connectors (20 or 21) receiving the source video IP flows. In still another alternative, the outbound video IP flow 521 is outputted by an additional front connector (not represented in FIG. 15) which does not receive any source video IP flow.

Reference is made back to FIGS. 14A to 14E. In a particular aspect, the plurality of source video IP flows (e.g. 511 and 511') consists of multicast IP flows, and the outbound video IP flow 521 also consists of a multicast IP flow.

The destination IP address of the outbound video IP flow 521 consists of a multicast IP address (e.g. 224.2.132.80) different from the multicast destination IP addresses (e.g. 224.2.132.70 and 224.2.132.71) of the source video IP flows. The multicast IP address (e.g. 224.2.132.80) of the outbound video IP flow 521 is comprised in the characteristics 425 stored in memory 420.

In another particular aspect, the plurality of source video IP flows (e.g. 511 and 511') consists of multicast IP flows, and the outbound video IP flow 521 consists of a unicast IP flow. The destination IP address of the outbound video IP flow 521 consists of a unicast IP address, which is by construction different from the multicast destination IP addresses of the source video IP flows. The unicast IP address of the outbound video IP flow 521 is comprised in the characteristics 425 stored in memory 420.

In still another particular aspect, the plurality of source video IP flows (e.g. 511 and 511') consists of unicast IP flows, and the outbound video IP flow 521 consists of a multicast IP flow. The destination IP address of the outbound video IP flow 521 consists of a multicast IP address, which is by construction different from the unicast destination IP addresses of the source video IP flows. The multicast IP address of the outbound video IP flow 521 is comprised in the characteristics 425 stored in memory 420.

In yet another particular aspect, the plurality of source video IP flows (e.g. 511 and 511') consists of unicast IP flows, and the outbound video IP flow 521 also consists of a unicast IP flow. The destination IP address of the outbound video IP flow 521 consists of a unicast IP address different from the unicast destination IP addresses of the source video IP flows. The unicast IP address of the outbound video IP flow 521 is comprised in the characteristics 425 stored in memory 420.

In another particular aspect, the plurality of source video IP flows (e.g. 511 and 511') consists of a combination of multicast and unicast IP flows, and the outbound video IP flow 521 consists of either a multicast or a unicast IP flow. If the outbound video IP flow 521 consists of a multicast IP flow, its destination IP address consists of a multicast IP address different from the multicast destination IP addresses of the multicast source video IP flows. If the outbound video IP flow 521 consists of a unicast IP flow, its destination IP address consists of a unicast IP address different from the unicast destination IP addresses of the unicast source video IP flows.

As mentioned previously, the destination port of the outbound video IP flow 521 is the same as the destination port of the source video IP flow (e.g. 511) selected by the selection functionality 415. Alternatively, the destination port of the outbound video IP flow 521 is a pre-defined outbound destination port also comprised in the characteristics 425 stored in memory 420.

The source IP address and the source port of the outbound video IP flow 521 are generally the same as those of the source video IP flow (e.g. 511) selected by the selection functionality 415, but they may also be changed by the selection functionality 415 if needed.

The source video IP flows (e.g. 511 and 511') received by the SFP unit 400 may comprise an additional source payload (in addition to the source video payload). The additional source payload comprises one of the following: an audio payload, a metadata payload, a combination thereof, etc. The metadata payload comprises at least one of the following: closed caption text, subtitle text, rating text, etc. The outbound video IP flow 521 outputted by the SFP unit 400 further transports the additional source payload (e.g. audio and/or metadata payload), in addition to the source video payload of the source video IP flow (e.g. 511) selected by the selection functionality 415. The additional source payload of the selected source video IP flow (e.g. 511) may be modified by the selection functionality 415, before being outputted in the outbound video IP flow 521.

The source video IP flows (e.g. 511 and 511') received by the SFP unit 400 and the outbound video IP flow 521 outputted by the SFP unit 400 may use the IPv4 protocol, the IPv6 protocol, or a combination thereof.

As mentioned previously, the operations of the selection functionality 415 are remotely controlled. For this purpose, the SFP unit 400 receives a control message from a third party computing device (not represented in the Figures). The control message defines at least one of the following: the characteristics of the outbound video IP flow 521, characteristics of the plurality of source video IP flows (e.g. 511 and 511'), and an identification of a particular source video IP flow (e.g. 511) among the plurality of source IP flows to be selected by selection functionality 415.

The third party computing device for controlling the operations of the selection functionality 415 includes a user interface, allowing a user to enter user commands. The user commands are processed by the third party computing device to generate the control message transmitted to the SFP unit 400. The control message can be transported via the IP protocol. Upon reception of the control message (e.g. via the front connector 20 of the SFP unit 400), the processing unit 410 interprets the received control message, and controls the operations of the selection functionality 415 accordingly. The control message may be compliant with a standardized Control Plane Signaling protocol, such as the Simple Network Management Protocol (SNMP), OpenFlow, etc. Alternatively, the control message is compliant with a proprietary Control Plane Signaling protocol.

For example, the configuration of the selection functionality 415 via control messages received and processed by the SFP unit 400 comprises the following steps. For illustration purposes, the source video IP flows (e.g. 511 and 511') are multicast, and the outbound video IP flow 521 is also multicast. In a first step, a control message comprising the characteristics of two multicast source video IP flows 511 and 511' is received by the SFP unit 400. The characteristics consist of their respective multicast IP addresses 224.2.132.70 and 224.2.132.71. In a second step, a control message comprising the characteristics of the multicast outbound video IP flows 521 is received by the SFP unit 400. The characteristics consist of its multicast IP address 224.2.132.80. The first and second steps can be performed simultaneously via a single control message. In a third step, a control message comprising the identification of a particular source video IP flow (e.g. 511) among the two source video IP flows (511 and 511') is received by the SFP unit 400. The identification consists of the multicast IP address 22.2.132.70 of the particular source video IP flow 511. Upon reception of this control message, the SFP unit 400 outputs the outbound video IP flow 521 transporting the video payload of the selected source video IP flow 511. The packets of the source video IP flow 511' received by the SFP unit 400 are dropped. The outbound video IP flow 521 has the multicast IP address 224.2.132.80. In a fourth step, a control message comprising the identification of another particular source video IP flow (e.g. 511') among the two source video IP flows (511 and 511') is received by the SFP unit 400. The identification consists of the multicast IP address 224.2.132.71 of the particular source video IP flow 511'. Upon reception of this control message, the SFP unit 400 outputs the outbound video IP flow 521 transporting the video payload of the selected source video IP flow 511'. The packets of the source video IP flow 511 received by the SFP unit 400 are now dropped. Thus, at this fourth step, the selection functionality 415 switches from the source video IP flow 511 to the source video IP flow 511', as a source of video payload for the outbound video IP flow 521. As mentioned previously, the number of source video IP flows (e.g. 511 and 511') under the control of the SFP unit 400 is not limited to two, but can be higher.

If the outbound video IP flow 521 is multicast, the processing unit 410 implements a multicast functionality, for generating the multicast outbound video IP flow 521, and managing the registrations/unregistrations of remote entities to the multicast group of the multicast outbound video IP flow 521. Alternatively, the management of the registrations/unregistrations to the multicast group of the multicast outbound video IP flow 521 is not performed by the SFP unit 400, but by an equipment upstream of the SFP unit 400.

Figure 16A:
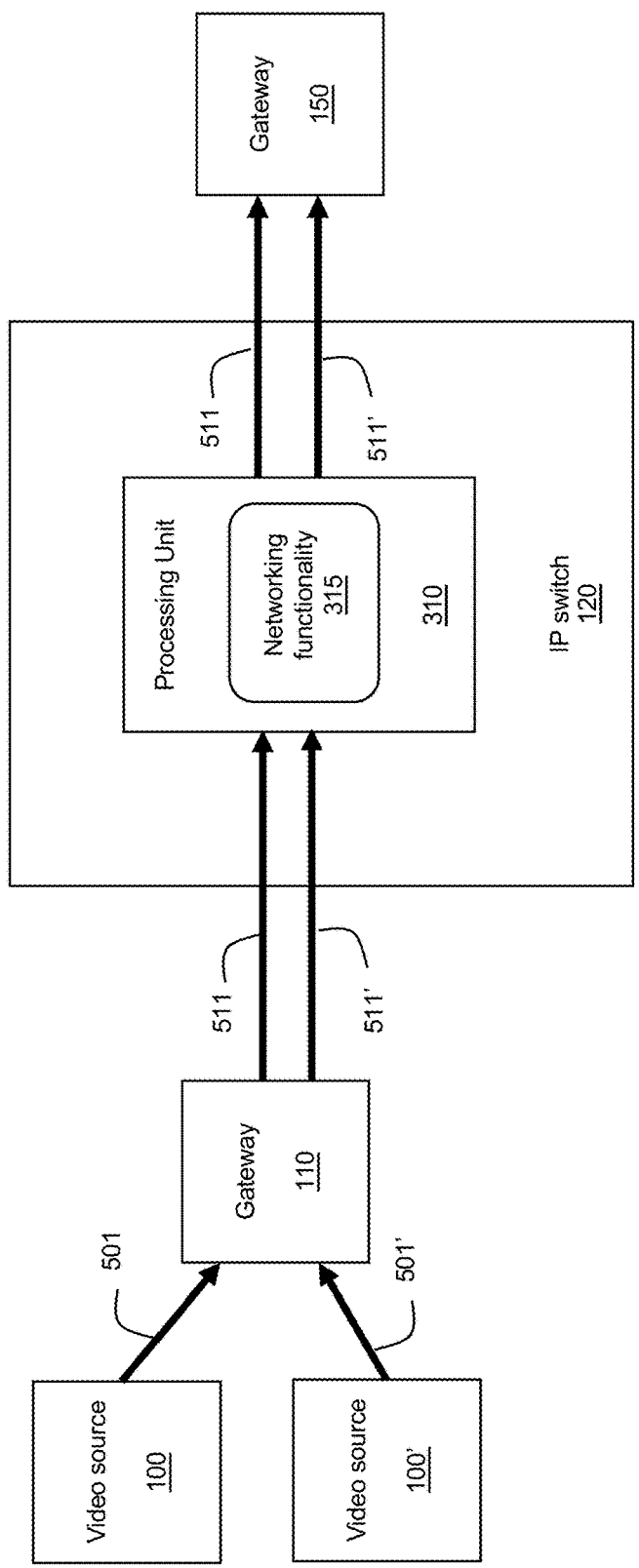
FIG. 16A represents a video distribution infrastructure not using the SFP unit implementing the selection functionality between a plurality of source video IP flow.
Figure 16B:
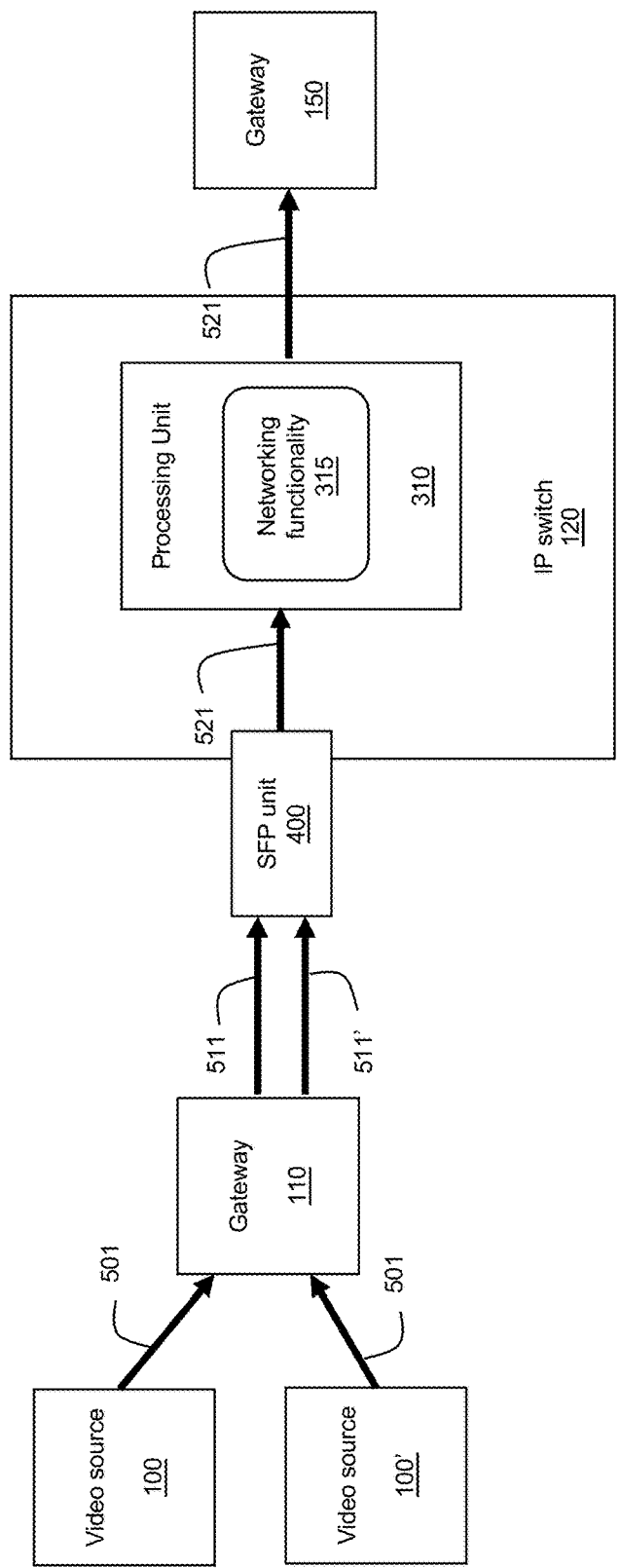
FIG. 16B represents a video distribution infrastructure using the SFP unit implementing the selection functionality between a plurality of source video IP flow.

Referring now concurrently to FIGS. 16A to 16B, an exemplary use of the SFP unit 400 is illustrated.

Referring more particularly to FIG. 16A, two video sources 100 and 100' respectively generate a SDI video signal 501 and 501'. For instance, the two video sources 100 and 100' are professional cameras filming an event, such as a concert or a sporting event. Only two video sources have been represented in FIG. 16A for simplification purposes, but a larger number of videos sources may generate a larger number of SDI video signals.

The SDI video signals 501 and 501' are transmitted to the gateway 110, which converts each SDI video signal 501 and 501' into a corresponding multicast video IP flow 511 and 511'. The gateway 110 transmits the multicast video IP flows 511 and 511' to the IP switch 120, which implements standard switching and/or routing functionalities (via a processing unit 310 executing a networking functionality 315). The IP switch 120 forwards the multicast video IP flows 511 and 511' to a destination gateway 150. The multicast video IP flows 511 and 511' may transit via one or more core routers, and one or more intermediate switches, before reaching the destination gateway 150. For instance, the destination gateway 150 is a broadcasting equipment, which transmits only one of the received multicast video IP flows 511 or 511' on a video distribution network. The broadcasting equipment 150 is always registered to two multicast groups corresponding to the two multicast video IP flows 511 or 511', and always receives simultaneously the two multicast video IP flows 511 or 511', although the broadcasting equipment 150 is transmitting only one of the two multicast video IP flows 511 and 511' on the distribution network. The choice of one among the two multicast video IP flows 511 or 511' depends on which view (provided either by camera 100 or camera 100') of the event shall be broadcasted at a given instant. There is therefore a waste of network resources between the gateways 110 and 150, since two multicast video IP flows 511 and 511' are transmitted, while only one is used at the gateway 150.

Referring more particularly to FIG. 16B, it is illustrated how the previously described SFP unit 400 is used to avoid the waste of network resources between the IP switch 120 and the gateway 150. The SFP unit 400 is inserted in a chassis of the IP switch 120.

The SFP unit 400 receives the two multicast video IP flows 511 and 511' via a front connector (not represented in FIG. 16B for simplification purposes) from the gateway 110.

The SFP unit 400 processes the two source multicast video IP flows 511 and 511' to generate the outbound multicast video IP flow 521, as detailed previously in the description (with reference to FIGS. 14A to 14E). The multicast video IP flow 521 is outputted by a rear connector (not represented in FIG. 16B for simplification purposes) of SFP unit 400. The multicast video IP flow 521 transports the video payload of one of the source multicast video IP flows 511 and 511', which has been selected by the SFP unit 400 based on a control message (not represented in FIG. 16B) received from the gateway 150 (or from another equipment). The control message directs the SFP unit 400 to select the one of the two source multicast video IP flows 511 and 511' which is currently useful to the gateway 150 (e.g. the one to be currently broadcasted by the gateway 150 on a video distribution network).

The processing unit 310 of the IP switch 120 receives the multicast video IP flow 521 from the SFP unit 400, the networking functionality 315 processes the multicast video IP flow 521, and the multicast video IP flow 521 is forwarded to the gateway 150.

Thus, between the IP switch 120 and the gateway 150, a single multicast video IP flow 521 transporting the video payload currently used by the gateway 150 is present, instead of the two source multicast video IP flows 511 and 511' as illustrated in FIG. 16A. The gain in bandwidth increases with the number of source multicast video IP flows (only two have been represented in FIGS. 16A and 16B for simplification purposes) processed by the SFP unit 400 to generate the single multicast video IP flow 521.

Figure 17:
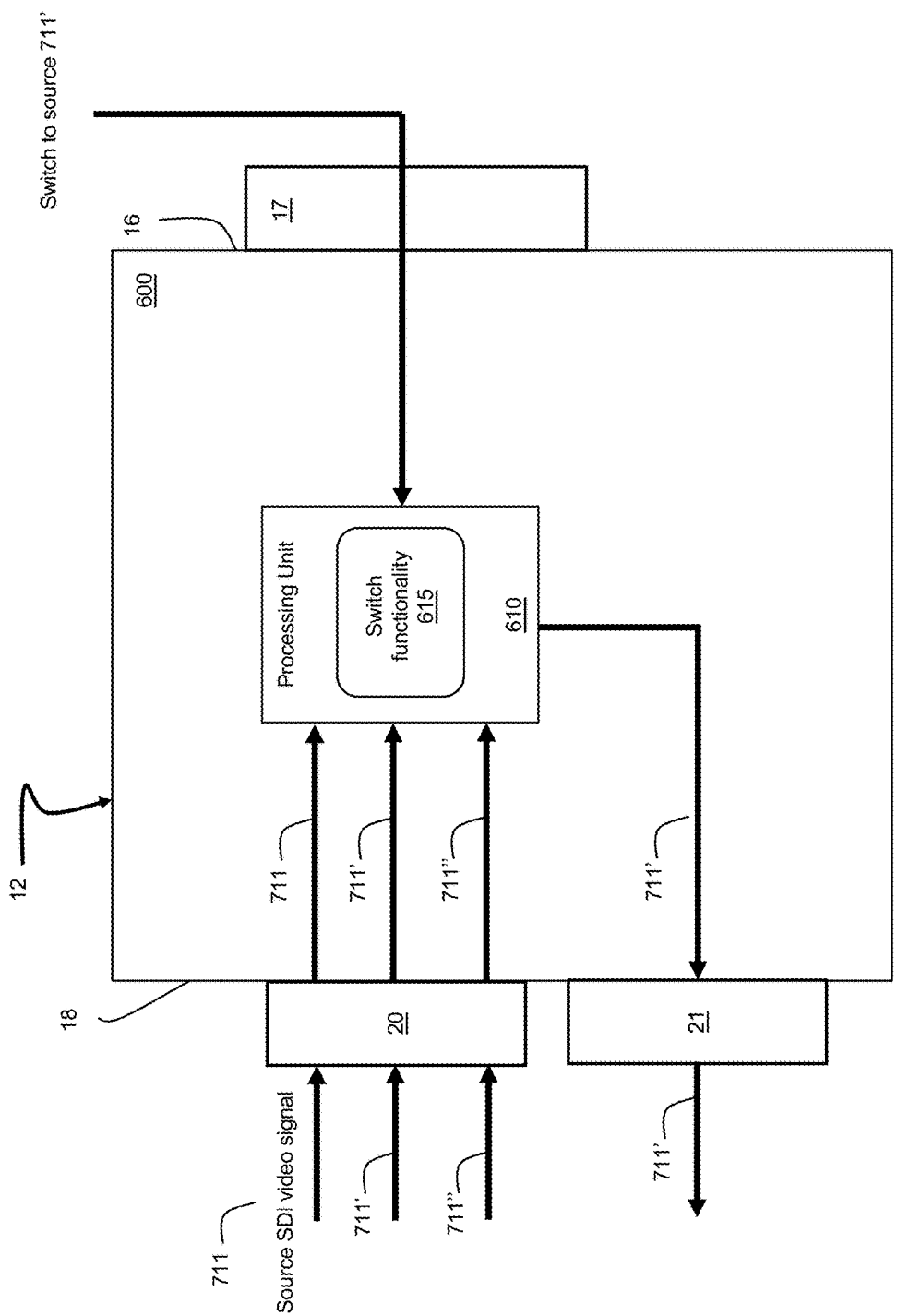
FIG. 17 represents an SFP unit implementing a switch functionality between a plurality of source SDI video signals.

SFP Unit Implementing a Switch Functionality Between a Plurality of Source SDI Video Signals Referring now to FIG. 17, a SFP unit 600 adapted for being inserted into a chassis of a hosting unit, and implementing a switch functionality, is represented. The SFP unit 600 corresponds to the SFP unit 10 represented in FIGS. 1 to 6, and comprises the housing 12, the back panel 16 and the front panel 18.

The SFP unit 600 receives a plurality of source SDI video signals via one of more SDI connectors located on the front panel 18. The one or more SDI connectors are adapted to receive SDI signals transporting a video payload. For example, as illustrated in FIG. 17, three source SDI video signals 711, 711' and 711" are received by SDI connector 20. The source SDI video signals 711, 711' and 711" are received from one or more video sources, such as a professional camera, a gateway, a video server, etc.

The SFP unit 600 comprises a processing unit 610 in the housing 12 implementing a switch functionality 615. The switch functionality 615 is implemented by a software executed by the processing unit 610. Alternatively, the switch functionality 615 is implemented by dedicated hardware component(s) of the processing unit 610 (e.g. one or several Field-Programmable Gate Array (FPGA)).

The switch functionality 615 selects one among the received SDI video signals. The selected SDI video signal is outputted via one of the SDI front connector(s) of the SFP unit 600. For example, as illustrated in FIG. 17, the switch functionality 615 selects the source SDI video signal 711', which is outputted via the front SDI connector 21. The outputted SDI video signal (e.g. 711') is transmitted to a destination equipment, which uses one of SDI video signals 711, 711' or 711" based on specific operating conditions.

Control messages are transmitted by a third party computing device (not represented in FIG. 17 for simplification purposes) for remotely controlling the operations of the SFP unit 600. For example, as illustrated in FIG. 17, the SFP unit 600 receives a control message requesting a switch to source SDI video signal 711'. The control message is received via a rear connector 17 located on the back panel 16. The control message is transmitted to the processing unit 610, and the switch functionality 615 executes the switch. For instance, the source SDI video signal 711 received via the front connector 20 is currently outputted via the front connector 21. Following reception of the control message, the source SDI video signal 711' received via the front connector 20 is now outputted via the front connector 21 (and the source SDI video signal 711 received via the front connector 20 is no longer outputted via the front connector 21).

The control message comprises an identification of the selected source SDI video signal (e.g. 711'). For example, the identification consists of identification data located in the video payload of the received SDI video signals. The switch functionality 615 analyzes the video payloads of the received SDI video signals, to identify the selected SDI video signal based on a presence of the identification data in its video payload.

If the SFP unit 600 has several SDI front connectors (e.g. 20 and 21), the control message may also include a selection of one among the several SDI front connectors for outputting the source SDI video signal selected through the control message.

The SFP unit 600 can be used in the context of a broadcasting of a video program. For example, the first source SDI video signal 711 transports a video payload consisting of a video program and a logo associated to the video program. For instance, the logo identifies a channel broadcasting the video program. The second source SDI video signal 711' transports a video payload consisting of the logo only. The third source SDI video signal 711" transports a video payload consisting of a default out of service image. A third party computing device remotely controls the SFP unit 600 through the aforementioned control messages. In a first step, a control message is sent to the SFP unit 600 to switch to the SDI video signal transporting the video program and the logo. In case of a critical downgrade of the signal quality of the video program, a control message is sent to the SFP unit 600 to switch to the SDI video signal transporting the default out of service image. In particular circumstances, a control message is sent to the SFP unit 600 to switch to the SDI video signal transporting the logo.

In a particular embodiment, instead of directly outputting the selected source SDI video signal (e.g. 711'), the processing unit 610 transforms the selected source SDI video signal (e.g. 711') into a corresponding outbound video IP flow (not represented in FIG. 17). For this purpose, the video payload of the selected source SDI video signal (e.g. 711') is extracted and inserted into the outbound video IP flow. The outbound video IP flow is outputted by a connector (front or rear) of the SFP unit 600 capable of transmitting signals transporting an IP flow. The characteristics of the outbound video IP flow (e.g. destination IP address and destination port) can also be configured via a control message received by the SFP unit 600.

Although the present disclosure has been described hereinabove by way of non-restrictive, illustrative embodiments thereof, these embodiments may be modified at will within the scope of the appended claims without departing from the spirit and nature of the present disclosure.

What is claimed is:
1. A small form-factor pluggable (SFP) unit comprising:
  a housing having standardized SFP dimensions and adapted to being inserted into a chassis of a hosting unit;
  a first connector for receiving a plurality of source Internet Protocol (IP) flows, each source IP flow transporting a source video payload;
  memory in the housing for storing characteristics of an outbound IP flow, the characteristics comprising the destination IP address of the outbound IP flow, the destination IP address of the outbound IP flow differing from the destination IP addresses of the source IP flows;
  a processing unit in the housing for selecting one among the plurality of source IP flows and generating outbound IP packets of the outbound IP flow based on the characteristics of the outbound IP flow stored in the memory, the outbound IP packets transporting the source video payload of the selected source IP flow; and
  a second connector for outputting the outbound IP packets of the outbound IP flow;
  wherein the selection of one among the plurality of source IP flows is based on an IP based control message received by the SFP unit and comprising the destination IP address of the selected source IP flow, the source video payload of the source IP flows having a destination IP address different from the destination IP address of the selected source IP flow being dropped.

2. The SFP unit of claim 1, wherein the characteristics stored in the memory further comprise the destination port of the outbound IP flow.

3. The SFP unit of claim 1, wherein the first connector is a connector located on a front panel of the housing, and the second connector is one of the following: a rear connector located on a back panel of the housing, another connector located on the front panel of the housing, and the first connector.

4. The SFP unit of claim 1, wherein the first connector is a rear connector located on a back panel of the housing, and the second connector is one of the following: a connector located on a front panel of the housing, and the first connector.

5. The SFP unit of claim 1, wherein the plurality of source IP flows are received via the first connector and another connector both located on a front panel of the housing.

6. The SFP unit of claim 1, wherein the plurality of source IP flows consist of multicast IP flows and the outbound IP flow consists of a multicast IP flow, the destination IP address of the outbound IP flow consisting of a multicast IP address different from the multicast destination IP addresses of the source IP flows.

7. The SFP unit of claim 1, wherein the plurality of source IP flows consist of multicast IP flows and the outbound IP flow consists of a unicast IP flow.

8. The SFP unit of claim 1, wherein the plurality of source IP flows consist of unicast IP flows and the outbound IP flow consists of a multicast IP flow.

9. The SFP unit of claim 1, wherein the plurality of source IP flows consist of unicast IP flows and the outbound IP flow consists of a unicast IP flow, the destination IP address of the outbound IP flow consisting of a unicast IP address different from the unicast destination IP addresses of the source IP flows.

10. The SFP unit of claim 1, wherein the plurality of source IP flows consist of a combination of multicast and unicast IP flows and the outbound IP flow consists of one of a multicast or a unicast IP flow.

11. The SFP unit of claim 1, wherein the selected source IP flow transports an additional payload, the additional payload comprising at least one of an audio payload and a metadata payload, and the outbound IP flow further transports the additional payload.

12. The SFP unit of claim 1, wherein the SFP unit receives an IP based control message from a third party computing device, the control message comprising at least one of the following: the characteristics of the outbound IP flow, and characteristics of the plurality of source IP flows.

* * * * *